United States Patent [19]

Fujioka et al.

[11] Patent Number: 5,739,901
[45] Date of Patent: Apr. 14, 1998

[54] DISTANCE MEASURING APPARATUS AND DISTANCE MEASURING METHOD FOR A VEHICLE

[75] Inventors: Hiroshi Fujioka; Masahira Akasu; Shoichi Tanaka, all of Tokyo, Japan

[73] Assignee: Mitsubishi Denki Kabushiki Kaisha, Tokyo, Japan

[21] Appl. No.: 542,842

[22] Filed: Oct. 13, 1995

[30] Foreign Application Priority Data

May 12, 1995 [JP] Japan .................. 7-114435

[51] Int. Cl.$^6$ .................................. G01C 3/08
[52] U.S. Cl. ...................... 356/5.01; 356/5.05
[58] Field of Search ................. 356/5.05, 5.01, 356/375; 250/214 R

[56] References Cited

U.S. PATENT DOCUMENTS

| | | | |
|---|---|---|---|
| 3,644,740 | 2/1972 | Dobratz et al. | 250/211 J |
| 5,179,286 | 1/1993 | Akasu | 280/561 |
| 5,504,570 | 4/1996 | Akasu | 356/5.05 |
| 5,523,835 | 6/1996 | Tanaka | 356/5.05 |
| 5,574,552 | 11/1996 | Donne | 356/5.05 |

FOREIGN PATENT DOCUMENTS 3-73880  3/1991  Japan .

*Primary Examiner*—Mark Hellner
*Attorney, Agent, or Firm*—Sughrue, Mion, Zinn, Macpeak & Seas, PLLC

[57] ABSTRACT

A distance measuring apparatus for a vehicle including: an irradiating means for emitting and irradiating an electromagnetic wave; a receiving means for receiving a reflected wave produced when the electromagnetic wave is reflected by an obstacle and generating a receiving signal; a propagation delay time period measuring means provided with a comparison value set such that a value for a comparison reference is larger in a case in which a propagation delay time period from irradiating to receiving the electromagnetic wave is shorter than in a case in which the propagation delay time period thereof is longer for comparing the receiving signal with the comparison value, recognizing a time point at which the receiving signal is equal to or larger than the comparison value when the receiving signal is compared with the comparison value as a receive detecting time point and measuring the propagation delay time period from a time point at which the irradiating means irradiates the electromagnetic wave to the receive detecting time point; and a distance calculating means for calculating a distance between the obstacle and a driving vehicle based on the propagation delay time period.

10 Claims, 17 Drawing Sheets

5,739,901

DISTANCE MEASURING APPARATUS AND DISTANCE MEASURING METHOD FOR A VEHICLE

BACKGROUND OF THE INVENTION

1. Field of the Invention

The present invention relates to a distance measuring apparatus which is mounted on a vehicle for measuring a distance between a driving vehicle and an obstacle present at the surrounding of the driving vehicle and its distance measuring method.

2. Discussion of Background

FIG. 13 is a block diagram showing construction of a conventional distance measuring apparatus for a vehicle. In FIG. 13, numeral 1 designates a light sending driver for outputting a light sending order for emitting light, numeral 2 designates a light emitting circuit for making a light emitting element such as laser diode etc., not shown, emit light by receiving the light sending order of the light sending driver 1 and sending the light toward a predetermined direction, numeral 3 designates an obstacle such as a vehicle or the like which is present in the direction of sending the light and reflects the light from the light emitting circuit 2, numeral 4 designates a light receiving circuit receiving a reflected light reflected by the obstacle 3 and generating a light receiving signal in accordance with an intensity of the reflected light and numeral 5 designates a propagation delay time period measuring means for measuring a propagation delay time period from when the light is sent from the light emitting circuit 1 to when the reflected light is received by the light receiving circuit 4 to which information at a time point of sending the light is inputted from the light sending driver 1 and to which the light receiving signal is inputted from the light receiving circuit 4. Numeral 6 designates an averaging means for averaging the propagation delay time periods which have been measured at a plural number of time points, numeral 7 designates a distance calculating means for calculating a distance between a driving vehicle to the obstacle 3 based on an average value of the propagation delay time periods which has been calculated by the averaging means 6 and numeral 8 designates a microcomputer including the light sending driver 1, the propagation delay time period measuring means 5, the averaging means 6 and the distance calculating means 7. Further, the detected distance calculated by the distance calculating means 7 is employed in various usages wherein it is used in other processing of the microcomputer 8 or it is sent to other microcomputer, not shown.

FIG. 14 is a flow chart showing the operation of the conventional apparatus and FIG. 15 illustrates time charts showing the operation of the conventional apparatus. In step S1, the operation detects that the light sending driver 1 outputs the light sending order. In response thereto, in step S2, the operation starts measuring time period by a counter, not shown. The counting by the counter is performed by incrementing 1 at every time of detecting a pulse of a pulse series having a predetermined frequency. In step S3, the operation compares the light receiving signal generated by the light receiving circuit 4 with a predetermined threshold level and detects a time point at which the light receiving signal is equal to or larger than the threshold level as a received light detecting time point. Here, although a true distance to the obstacle 3 is indicated by the propagation delay time period up to the light receiving time point, the threshold level is set in consideration of an adverse influence caused by noise etc., the time point at which the size of the light receiving signal is equal to or larger than the threshold level is determined to be the received light detecting time point and the distance to the obstacle 3 is calculated based on the propagation delay time period up to the received light detecting time point. In step S4 the operation stops the counting operation by the counter by detecting the received light detecting time point, stores the counted value of the counter as the propagation delay time period and clears the counter in preparation for the counting operation at the next time. In step S5 the operation determines whether the measurement of the propagation delay time period has been performed by a predetermined number of times, for example, 10 times, the operations returns to step S1 when it is smaller than 10 times, the operation proceeds to step S6 when it reaches 10 times and averages the propagation delay time periods of 10 times. In step S7 the operation calculates the distance to the obstacle 3 based on the averaged propagation delay time period. This calculation is performed based on the propagation delay time period and a light speed or by using a table etc. in which distances are stored in correspondence with the propagation delay time periods.

The detection of the received light detecting time point has been performed in the conventional apparatus as mentioned above and therefore, the distance to the obstacle may erroneously be detected by disturbances such as fog etc.

An explanation will be given thereto by using drawings. FIG. 16 and FIG. 17 are explanatory views for explaining a conventional problem wherein FIG. 16 illustrates measuring operation when fog 9 is generated and FIG. 17 illustrates the detection of the received light detecting time point at that time.

When the fog 9 is not caused, light sent from the light emitting circuit 2 as shown by a bold line in FIG. 16 reaches the obstacle 3 and the light reflected thereby returns to the light receiving circuit 4. The received light detecting time point in this case is t2 as shown in FIG. 17. By contrast, in case where the fog 9 is caused, light sent by the light emitting circuit 2 as shown by a broken line in FIG. 16 does not reach the obstacle 3, but is reflected by the fog 9 and returns to the light receiving circuit 4. Therefore, the propagation delay time period is very much shortened in comparison with the case where the fog 9 is not generated and a time point designated by t1 in FIG. 17 is detected as the received light detecting time point.

It may be considered that the threshold level is raised from a level shown by a bold line to a level shown by a broken line in FIG. 17 to prevent the adverse effect. However, when the obstacle 3 is at a long distance, the reflected light is weakened and the light receiving signal is reduced in response thereto. Accordingly, when a signal having a strong signal intensity shown by a broken line in FIG. 17 is not detected, there causes a new problem wherein an obstacle at a long distance cannot be detected.

Further, there is a problem in which an error is caused in a measured distance in accordance with the intensity of the light receiving signal even if the distance to the obstacle 3 remains the same as shown in FIG. 18. In FIG. 18, notation t3 designates the light receiving time point at which the light receiving circuit 4 receives the reflected light, notation t4 designates the received light detecting time point in case where the signal intensity of the light receiving signal is strong and notation t5 designates the received light detecting time point in case where the signal intensity of the light receiving signal is weak.

Further, the change in the signal intensity of the light receiving signal is caused by whether the obstacle is easy to reflect light, a case where the function of the light emitting circuit 2 or the light receiving circuit 4 is lowered from the initial state by aging, deterioration or contamination, scattering of sending light by fog, rain or the like.

SUMMARY OF THE INVENTION

It is an object of the present invention to resolve the above-mentioned problem and to provide a distance measuring apparatus for a vehicle capable of accurately measuring a distance to an obstacle with no erroneous detection.

Further, it is an object of the present invention to provide a distance measuring method capable of accurately measuring a distance to an obstacle with no erroneous detection.

According to a first aspect of the present invention, there is provided a distance measuring apparatus for a vehicle including:

an irradiating means for emitting and irradiating an electromagnetic wave;

a receiving means for receiving a reflected wave produced when the electromagnetic wave is reflected by an obstacle and generating a receiving signal;

a propagation delay time period measuring means provided with a comparison value set such that a value for a comparison reference is larger in a case in which a propagation delay time period from irradiating to receiving the electromagnetic wave is shorter than a value for a comparison reference in a case in which the propagation delay time period thereof is longer for comparing the receiving signal with the comparison value, recognizing a time point at which the receiving signal is equal to or larger than the comparison value as a received light detecting time point and measuring the propagation delay time period from a time point at which the irradiating means irradiates the electromagnetic wave to the received light detecting time point; and a distance calculating means for calculating a distance between the obstacle and a driving vehicle based on the propagation delay time period.

According to a second aspect of the present invention, there is provided a distance measuring apparatus for a vehicle including:

an irradiating means for emitting and irradiating an electromagnetic wave;

a receiving means for receiving a reflected wave produced when the electromagnetic wave is reflected by an obstacle;

a propagation delay time period measuring means for comparing the receiving signal with a predetermined comparison value, recognizing a time point at which the receiving signal is equal to or larger than the comparison value as a received light detecting time point and measuring a propagation delay time period from a time point at which the irradiating means irradiates the electromagnetic wave to the received light detecting time point;

a distance calculating means for calculating a distance between the obstacle and a driving vehicle based on the propagation delay time period;

a signal intensity detecting means for detecting a signal intensity of the receiving signal; and a first correcting means provided with a first correction value set in accordance with the signal intensity for correcting the distance by using the first correction value.

According to a third aspect of the present invention, there is provided the distance measuring apparatus according to the first aspect, further including a second correcting means provided with a second correction value set in accordance with the distance to the obstacle for correcting the distance by using the second correction value.

According to a fourth aspect of the present invention, there is provided a distance measuring apparatus for a vehicle including:

an irradiating means for emitting and irradiating an electromagnetic wave;

a receiving means for receiving a reflected wave produced when the electromagnetic wave is reflected by an obstacle and generating a receiving signal;

a propagation delay time period measuring means provided with a comparison value set such that a value for a comparison reference is larger in a case in which a propagation delay time period from irradiating to receiving the electromagnetic wave is shorter than a value for a comparison reference a case in which the propagation delay time period is longer for comparing the receiving signal with the comparison value, recognizing a time point at which the receiving signal is equal to or larger than the comparison value as a received light detecting time point and measuring the propagation delay time period from a time point at which the irradiating means irradiates the electromagnetic wave to the received light detecting time point;

a distance calculating means for calculating a distance between the obstacle and a driving vehicle based on the propagation delay time period;

a signal intensity detecting means for detecting a signal intensity of the receiving signal;

a first correcting means provided with a first correction value set in accordance with the signal intensity for correcting the distance by using the first correction value; and a second correcting means provided with a second correction value set in accordance with the distance to the obstacle for correcting the distance by using the second correction value.

According to a fifth aspect of the present invention, there is provided the distance measuring apparatus according to the fourth aspect, wherein the first correcting means and the second correcting means are constituted by a third correcting means provided with a third correction value set in accordance with both of the signal intensity and the distance for simultaneously performing a correction based on the signal intensity and the distance by using the third correction value.

According to a sixth aspect of the present invention, there is provided a distance measuring method for measuring a distance to an obstacle based on a propagation delay time period from when an electromagnetic wave is irradiated to when a reflected wave produced when the electromagnetic wave is reflected by the obstacle is received including the steps of;

comparing a receiving signal generated by receiving the reflected wave with a comparison value set such that a value for a comparison reference is larger in a case in which the propagation delay time period from irradiating to receiving the electromagnetic wave is shorter than a value for a comparison reference in a case in which the propagation delay time period is longer and recognizing a time point at which the receiving signal is equal to or larger than the comparison value as a received light detecting time point;

measuring the propagation delay time period from a time point at which the electromagnetic wave is irradiated to the received light detecting time point; and calculating a distance between the obstacle and a driving vehicle based on the propagation delay time period.

According to a seventh aspect of the present invention, there is provided a distance measuring method for measuring a distance to an obstacle based on a propagation delay time period from when an electromagnetic wave is irradiated to when a reflected wave produced when the electromagnetic wave is reflected by an obstacle is received including the steps of:

comparing a receiving signal generated by receiving the reflected wave with a predetermined comparison value and recognizing a time point at which the receiving signal is equal to or larger than the comparison value as a received light detecting time point;

measuring the propagation delay time period from a time point at which the electromagnetic wave is irradiated to the received light detecting time period;

calculating a distance between the obstacle and a driving vehicle based on the propagation delay time period;

detecting a signal intensity of the receiving signal; and calculating a first correction value based on the signal intensity and correcting the distance by using the first correction value.

According to an eighth aspect of the present invention, there is provided the distance measuring method according to the sixth aspect, further including a step of calculating a second correction value based on the distance provided by the step of calculating the distance and correcting the distance by using the second correction value.

According to a ninth aspect of the present invention, there is provided a distance measuring method for measuring a distance to an obstacle based on a propagation delay time period from when an electromagnetic wave is irradiated to when a reflected wave produced when the electromagnetic wave is reflected by an obstacle is received including the steps of:

comparing a receiving signal generated by receiving the reflected wave with a comparison value set such that a value for a comparison reference is larger in a case where the propagation delay time period from irradiating to receiving the electromagnetic wave is shorter than a value for a comparison reference in a case where the propagation delay time period is longer and recognizing a time point at which the receiving signal is equal to or larger than the comparison value as a received light detecting time period;

measuring the propagation delay time period from a time point at which the electromagnetic wave is irradiated to the received light detecting time point;

calculating a distance from the obstacle to a driving vehicle based on the propagation delay time period;

detecting a signal intensity of the receiving signal;

calculating a first correction value based on the signal intensity and correcting the distance by using the first correction value; and calculating a second correction value based on the distance provided by the step of calculating the distance and correcting the distance by using the second correction value.

According to a tenth aspect of the present invention, there is provided the distance measuring method according to the ninth aspect, wherein the steps of correcting based on the first correction value and the second correction value are simultaneously performed by using a third correction value set in accordance with both of the signal intensity and the distance.

The distance measuring apparatus for a vehicle in accordance with the first aspect of the present invention is provided with the comparison value which is set such that the value for the comparison reference is larger in case where the propagation delay time period from irradiating to receiving the electromagnetic wave is shorter than that in the case where it is longer, compares the receiving signal with the comparison value and recognizes the time point at which the receiving signal is equal to or larger than the comparison value as the received light detecting time point.

Further, the distance measuring apparatus for a vehicle in accordance with the second aspect of the present invention calculates the first correction value based on the signal intensity of the receiving signal which has been detected by the signal intensity detecting means for detecting the signal intensity of the receiving signal and corrects the distance by using the first correction value.

Further, the distance measuring apparatus for a vehicle in accordance with the third aspect of the present invention calculates the second correcting value based on the distance to the obstacle and corrects the distance by using the second correction value.

Further, the distance measuring apparatus for a vehicle in accordance with the fourth aspect of the present invention is provided with the comparison value which is set such that the value of the comparison reference is larger in the case where the propagation delay time period from irradiating to receiving the electromagnetic wave is shorter than that in the case where it is longer, compares the receiving signal with the comparison value and recognizes the time point at which the receiving signal is equal to or larger than the comparison value as the received light detecting time point, calculates the distance between the obstacle and the driving vehicle based on the propagation delay time period from the time point at which the irradiating means irradiates the electromagnetic wave to the received light detecting time point, detects the signal intensity of the receiving signal and corrects the measured distance by the first correcting means in accordance with the signal intensity and corrects the measured distance by the second correcting means in accordance with the distance which has been calculated by the distance calculating means.

Further, the distance measuring apparatus for a vehicle in accordance with the fifth aspect of the present invention constitutes the first correcting means and the second correcting means by the third correcting means and simultaneously performs the corrections based on the signal intensity and the distance.

In the distance measuring method in accordance with the sixth aspect of the present invention, the comparison value which is set such that the value for the comparison reference is larger in the case where the propagation delay time period from irradiating to receiving the electromagnetic wave is shorter than that in the case where it is longer, is compared with the receiving signal which has been generated by receiving the reflected wave, the time point at which the receiving signal is equal to or larger than the comparison value is recognized as the received light detecting time point, the propagation delay time period from the time point at which the electromagnetic wave is irradiated to the received light detecting time point is measured and the distance between the obstacle and the driving vehicle is calculated based on the propagation delay time period.

Further, in the distance measuring method in accordance with the seventh aspect of the present invention, the signal intensity of the receiving signal is detected, the first correction value is calculated based on the signal intensity and the distance is corrected by using the first correction value.

Further, in the distance measuring method in accordance with the eighth aspect of the present invention, the second correction value is calculated based on the distance provided by the step of calculating the distance and the distance is corrected by using the second correction value.

Further, in the distance measuring method in accordance with the ninth aspect of the present invention, the comparison value which is set such that the value for the comparison reference is larger in the case where the propagation delay time period from irradiating to receiving the electromagnetic wave is shorter than that in the case where it is longer, is compared with the receiving signal which has been generated by receiving the reflected wave, the time point at which the receiving signal is equal to or larger than the comparison value is recognized as the received light detecting time point, the propagation delay time period from the time point at which the electromagnetic wave is irradiated to the received light detecting time point is measured, the distance between the obstacle and the driving vehicle is calculated based on the propagation delay time period, the measured distances is corrected based on the signal intensity of the receiving signal and the measured distance is corrected based on the distance provided by the step of calculating the distance.

Further, in the distance measuring method in accordance with the tenth aspect of the present invention, the third correction value which has been set in accordance with both of the signal intensity and the distance is used and the corrections of the measured distance based on the signal intensity and the distance are simultaneously performed.

DETAILED DESCRIPTION OF THE PREFERRED EMBODIMENTS

EMBODIMENT 1

Embodiment 1 provides a distance measuring apparatus and a distance measuring method for a vehicle which do not erroneously detect an obstacle by disturbances such as fog, rain or the like and which is capable of firmly measuring a distance even when the obstacle is at a long distance.

Figure 1:
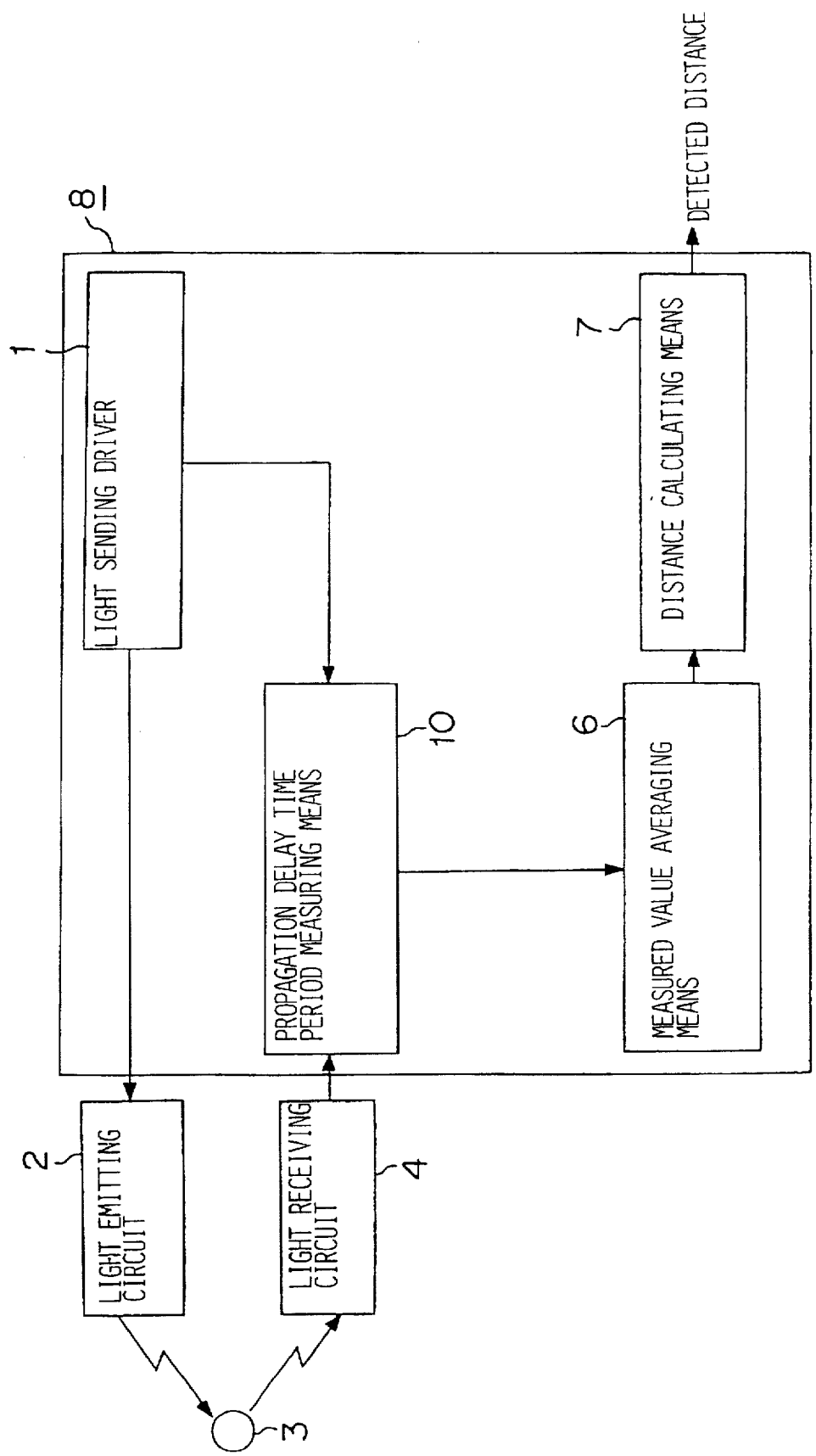
FIG. 1 is a block diagram showing the construction of a first embodiment.

FIG. 1 shows Embodiment 1 in a block diagram. In FIG. 1, numeral 1 designates a light sending driver outputting a light sending order to emit light that is a kind of an electromagnetic wave, numeral 2 designates a light emitting circuit as an irradiating means for making a light emitting element such as a laser diode, not shown, emit light by receiving the light sending order of the light sending driver 1 and sends the light toward a predetermined direction, numeral 3 designates an obstacle such as a vehicle or the like which is present in the direction of sending the light and which reflects the light from the light emitting circuit 2, numeral 4 designates a light receiving circuit as a receiving means which receives a reflected light that is a reflected wave reflected by the obstacle 3 and which generates a light receiving signal that is a receiving signal in accordance with an intensity of the reflected light, numeral 10 designates a propagation delay time period measuring means for measuring a propagation delay time period from when the light emitting circuit sends the light to when the light receiving circuit 4 receives the reflected light, to which information at a light sending time point is inputted from the light sending driver 1 and to which the light receiving signal is inputted from the light receiving circuit 4. Numeral 6 designates an averaging means for averaging the propagation delay time periods which have been measured at a plural number of time points, numeral 7 designates a distance calculating means for calculating a distance between a driving vehicles and the obstacle 3 based on an average value of the propagation delay time period which has been calculated by the averaging means 6 and numeral 8 designates a microcomputer including the light sending driver 1, the propagation delay time period measuring means 10, the averaging means 6 and the distance calculating means 7. Further, the detected distance calculated by the distance calculating means 7 is employed in various usages wherein it is used in other processing of the microcomputer 8 or it is sent to other microcomputer, not shown.

Although the operation of the embodiment 1 is approximately the same as that of the conventional apparatus, the way of detecting the received light detecting time point as the signal receiving time point is different therefrom.

Figure 2:
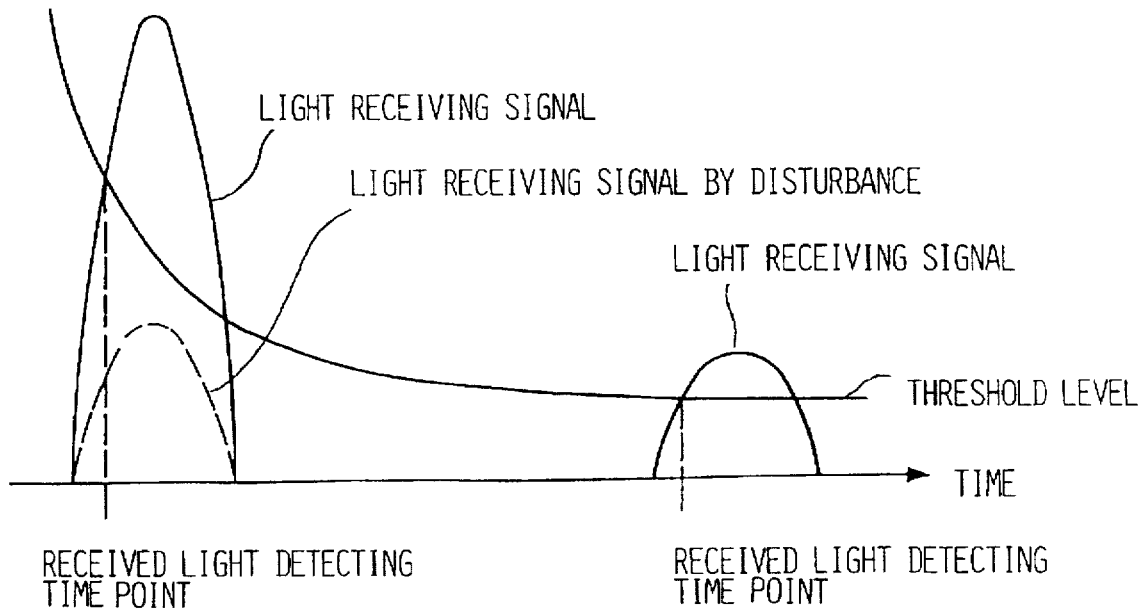
FIGS. 2(a) and 2(b) are explanatory views for explaining the operation of a propagation delay time period measuring means 10.
Figure 2:
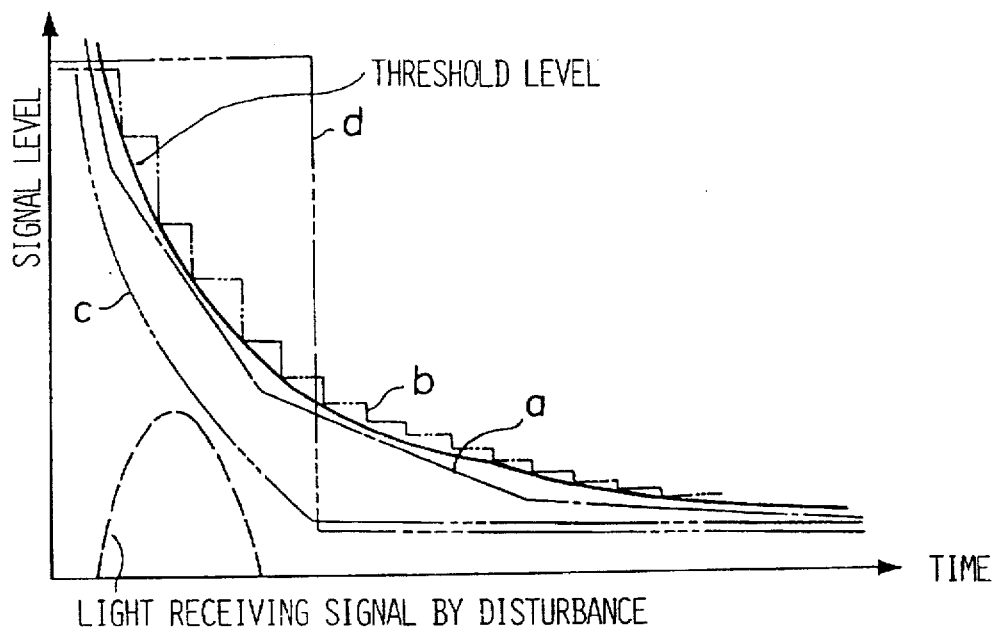

FIGS. 2(a) and 2(b) are explanatory views for explaining the operation of the propagation delay time period measuring means 10 of the embodiment 1.

The threshold level set as a comparison value in the propagation delay time period measuring 10 is set such that it is larger in case where the propagation delay time period is shorter than that in case where it is longer, that is, in the former case it is located nearer to the left in FIG. 2(a) and 2(b). This threshold level utilizes a discharge curve of an integrating circuit constituted by, for example, a RC series circuit and the selection of the curve is performed by changing the time constant of the RC series circuit.

In FIGS. 2(a) and 2(b), a light receiving signal caused by disturbance such as fog, rain etc. is shown by a broken line. The light receiving signal caused by a disturbance is generated when the propagation delay time period is comparatively short and its position is almost determined. Further, the intensity of reflection by the disturbance is smaller than that of light reflected by the obstacle 3.

Accordingly, when the threshold level is set as shown in FIGS. 2(a) and 2(b), the light receiving signal caused by a disturbance does not exceed the threshold level and therefore, the light receiving signal by the disturbance is not erroneously recognized as the light receiving signal caused by the obstacle 3.

Further, actually, when the obstacle 3 is at a short distance, the light receiving signal having a comparatively large signal intensity is generated since the scattering of the sent light is inconsiderable. The light receiving signal in this case is sufficiently larger than the threshold level as is illustrated in FIG. 2(a) and the propagation delay time period measuring means 10 recognizes as the received light detecting time point the time point at which the light receiving signal is equal to or larger than the threshold level. Accordingly, there is no case where the obstacle 3 cannot be detected even if the threshold level at a short portion of the propagation delay time period is enlarged.

Further, in case where the obstacle 3 is at a long distance, the signal intensity of the light receiving signal is smaller than that in case where it is at a short distance. However, the obstacle 3 can firmly be detected since the threshold level is made sufficiently small at a comparatively long portion of the propagation delay time period, as is illustrated in FIG. 2(a).

Therefore, according to Embodiment 1, the reflected light caused by the disturbance is not erroneously recognized as an obstacle and even if the obstacle is at a long distance, the distance can be measured.

Further, although the threshold level is constituted by a curve rising toward left which can be simply formed by a RC series circuit in the above-mentioned embodiment, the invention is not restricted thereto and is applicable to a case where the detection level is comparatively large in a region wherein the propagation delay time period is short and the detection level is comparatively small in a region wherein the propagation delay time period is long.

For example, as is illustrated in FIG. 2(b), there are various methods wherein the curve of the threshold level is approximated by a plurality of straight lines as in a one-dotted line chain "a", a step-like waveform rising toward left is formed as in a two-dotted chain line "b", a straight line rising toward left at a portion thereof wherein the propagation delay time period is comparatively short and a horizontal line successive to the straight line are formed as in a three-dotted chain line "c", a curve wherein the comparison value is large at a portion thereof wherein the propagation delay time period is comparatively short and the comparison value is small at a portion thereof wherein the propagation delay time period is comparatively long is formed as in a four-dotted chain line "d", and the like.

EMBODIMENT 2

Embodiment 2 provides a distance measuring apparatus and a distance measuring method for a vehicle dispensing with an error in a measured distance caused by a variation in the signal intensity of the light receiving signal.

Figure 3:
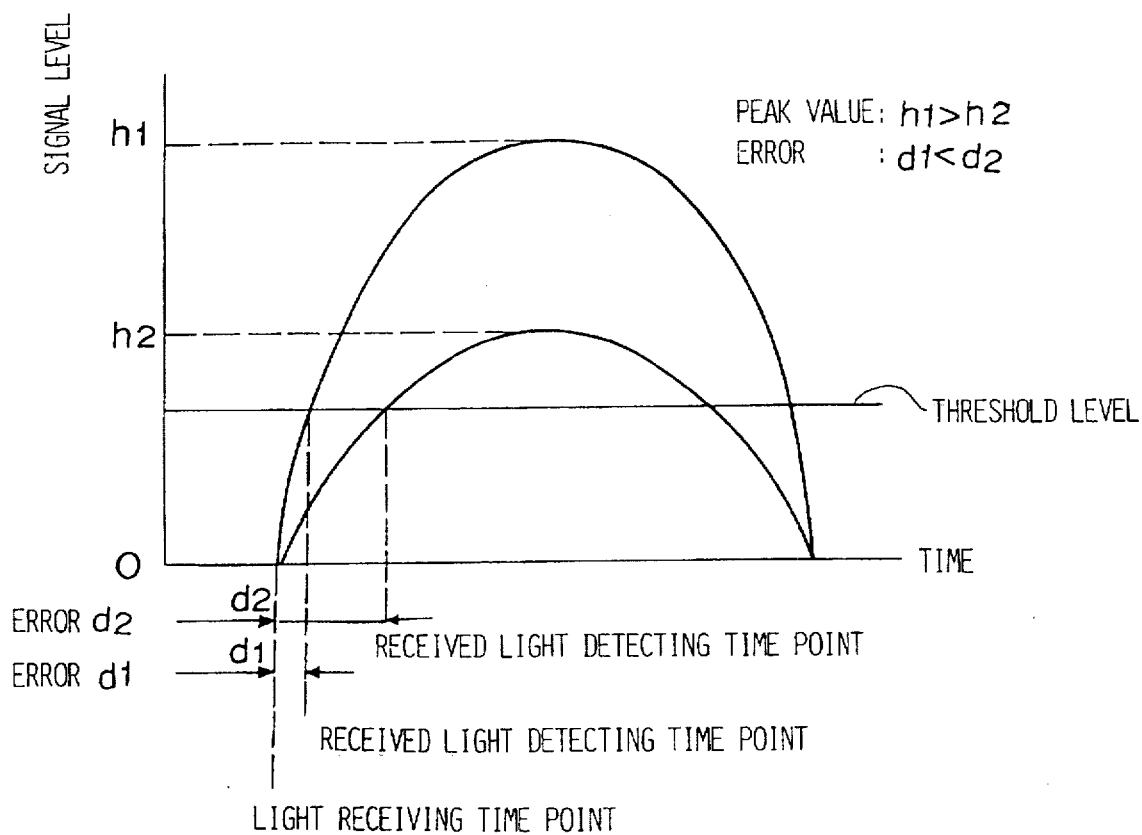
FIG. 3 is an explanatory view explaining that an error is caused by a variation in a signal intensity of a receiving signal.

FIG. 3 is an explanatory view explaining that an error is caused by a variation in the signal intensity of the light receiving signal. This figure shows a case where the reflectance or the size of the obstacle 3 varies even when the distance to the obstacle 3 remains the same. The signal intensity of the light receiving signal is in correspondence with the intensity of the reflected light and therefore, in case where the reflectance of the obstacle 3 is large or its outer configuration is large the signal intensity is strengthened and in case where the reflectance of the obstacle 3 is small or the outer configuration is small the signal intensity is weakened.

In FIG. 3, it is shown that a time period to the light receiving time point, and accordingly a distance to the obstacle 3 remains the same. However, the distance to the obstacle 3 is calculated based on the propagation delay time period from the light sending time point to the received light detecting time point as mentioned above. That is, a distance corresponding to a time period from the light receiving time point to the received light detecting point is included as an error in the value calculated as the measured distance.

Here, when cases wherein the signal intensities of the light receiving signals are different are compared with each other, more time is required to reach the threshold level in case of the light receiving signal having a weak signal intensity since the rise of the signal is moderate and therefore, the error is magnified in comparison with a case where the signal intensity is strong.

Embodiment 2 resolves such a problem and accurately detects the distance to the obstacle irrespective of the signal intensity of the light receiving signal.

Figure 4:
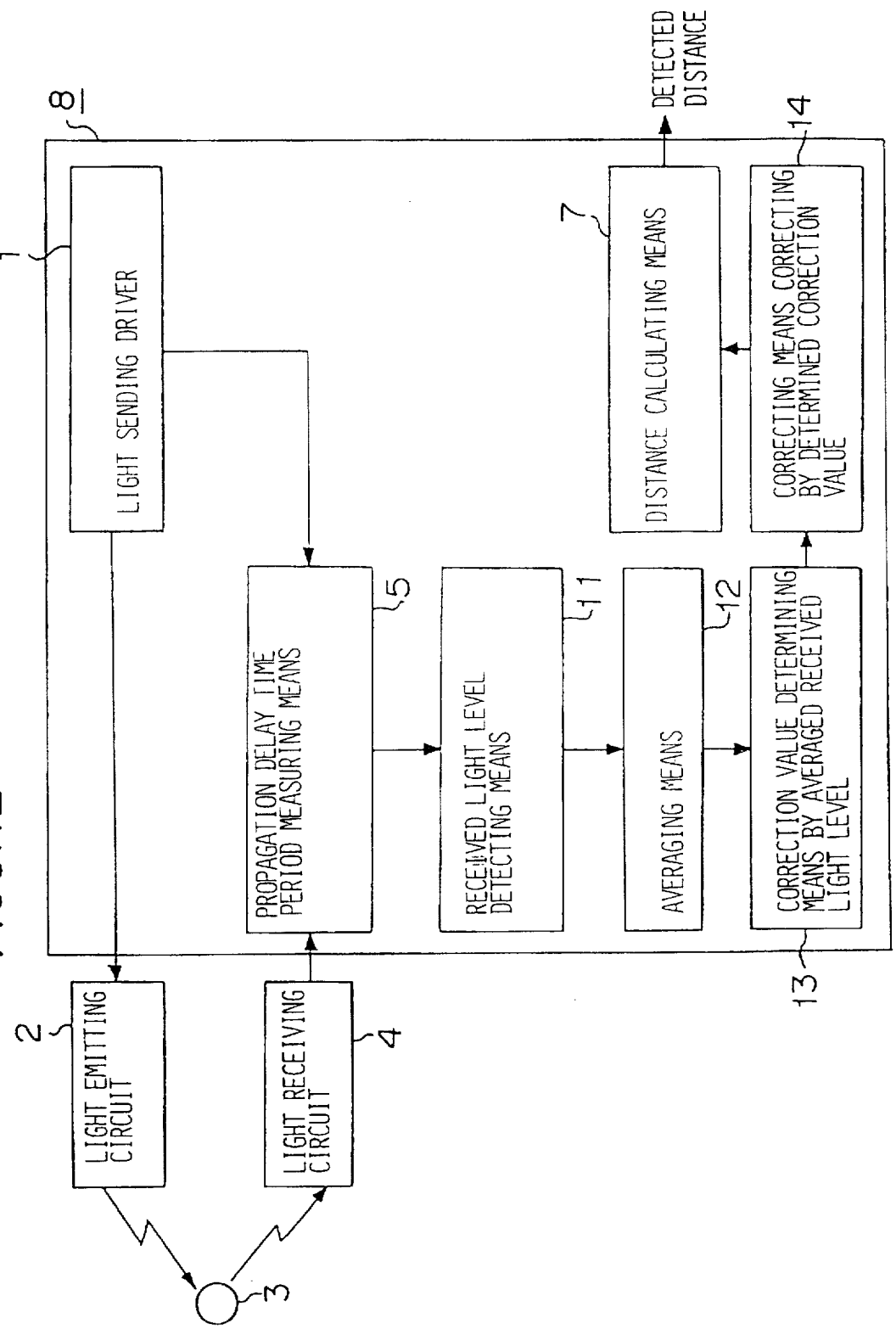
FIG. 4 is a block diagram showing the construction of a second embodiment.
Figure 5:
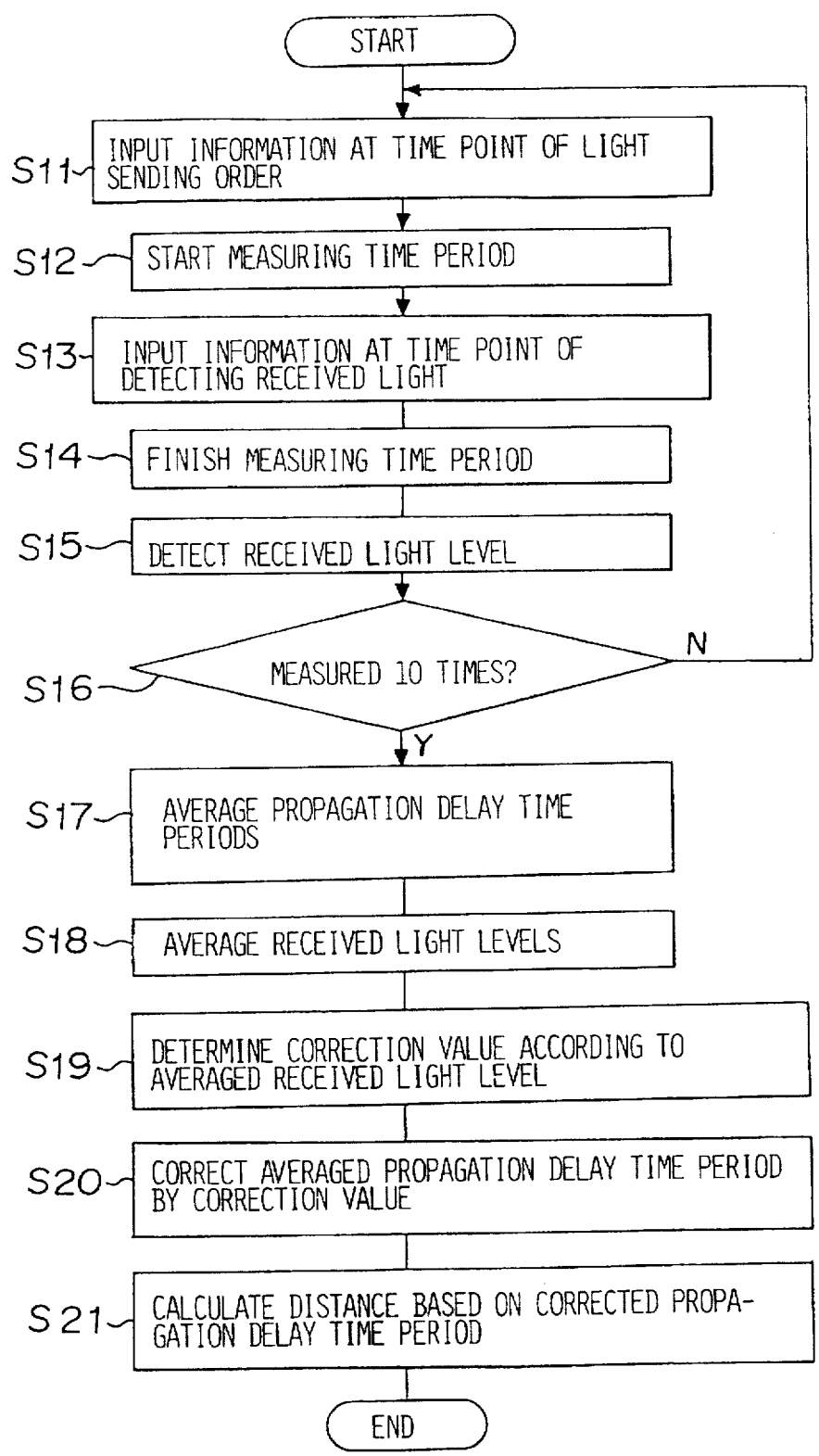
FIG. 5 is a flow chart showing the operation of the second embodiment.

FIG. 4 is a block diagram showing the construction of Embodiment 2 and FIG. 5 is a flow chart showing the operation of Embodiment 2. In FIG. 4, portions attached with the same notations as the formerly designated ones are the same with or corresponding to the formerly designated ones.

In FIG. 4, numeral 11 designates a received light level detecting means as a signal intensity detecting means for detecting the signal intensity, that is, a light receiving level of the light receiving signal generated by the light receiving circuit 4, numeral 12 designates an averaging means for averaging the propagation delay time periods and the light receiving levels which have been measured at a plural number of time points, numeral 13 designates a correction value determining means for determining a correction value as a first correction value in accordance with the averaged received light level and numeral 14 designates a correcting means for correcting the propagation delay time period which has been averaged in the averaging means 12 by the determined correction value wherein the correction value determining means 13 and the correcting means 14 constitute a first correcting means.

Next, an explanation will be given of the operation of Embodiment 2 in reference to FIG. 5.

In step S11 the light sending driver 1 detects that the light sending order is outputted and in response thereto the operation starts measuring a time period by a counter, not shown, in step S12. The counting by the counter is performed by incrementing by 1 at every time when a pulse of a pulse series having a predetermined frequency is detected. In step 13 the operation compares the light receiving signal generated in the light receiving circuit 4 with a predetermined threshold level and detects a time point at which the light receiving signal is equal to or larger than the threshold level as a received light detecting time point. Here, although a true distance to the obstacle 3 is expressed by a propagation delay time period to the light receiving time point, the threshold level is set in consideration of an adverse influence caused by noise etc., a time point at which the light receiving signal is equal to or larger than the threshold level is determined to be the received light detecting time point and a distance to the obstacle 3 is calculated based on the propagation delay time period up to the received light detecting time point. In step S14, the operation stops the counting operation of the counter by detecting the received light detecting time point, stores the counted value of the counter as the propagation delay time period and clears the counter in preparation for the counting operation of the next time. In step S15 the operation detects the light receiving level of the light receiving signal, that is, the signal level as shown in FIG. 3. In step S16 the operation determines whether the measurement of the propagation delay time period has been performed by a predetermined number of times, for example, 10 times, returns to step S11 when it is less than 10 times, proceeds to step S17 when it reaches 10 times and averages the propagation delay time periods of 10 times. In step 18 the operation similarly averages the light receiving levels of 10 times.

In step S19 the operation determines a correction value in accordance with the averaged light receiving level. With regard to the correction value, as shown in FIG. 3, the correction value in correspondence with the error d1 is determined when the averaged light receiving level is h1 whereas the correction value in correspondence with the error d2 is determined when the averaged light receiving level is h2.

Further, these correction values are given by data of time corresponding to the errors. This data is stored in a table which is set in plural stages in correspondence with the light receiving level and values of the table is read in accordance with the values of the averaged light receiving levels.

In step S20 the operation adds the correction value which has been determined in step S19 to the propagation delay time period which has been averaged in step S17. In step S21 the operation calculates the distance to the obstacle 3 based on the corrected propagation delay time period. This calculation is performed based on the propagation delay time period and a light speed or by using a table in which distances are stored in correspondence to the propagation delay time periods or the like.

Therefore, according to Embodiment 2, there causes no error in the measured distance to the obstacle by the signal intensity of the light receiving signal.

Further, although a plurality of correction values are set in and read from the table in Embodiment 2, a function may be provided and the correction values may continuously be calculated based on the function.

Further, although the correction values are data of time in Embodiment 2, they may be data of distance.

That is, distances in correspondence with the averaged propagation delay time periods are calculated. Here, the correction values are set as data of distance corresponding to the time periods of the error d1 or d2 as shown in FIG. 3.

Accordingly, the correction values set as data of distance in correspondence with the signal intensities may be read and the correction values and the distances corresponding to the averaged propagation delay time periods may be calculated.

Further, although the peak level of the light receiving signal is used to determine the signal intensity, any substitute may be used so far as it expresses the intensity of the signal. For example, the light receiving signal is integrated and the determination may be preformed by the integrated value.

EMBODIMENT 3

Embodiment 3 is an improvement of Embodiment 1 wherein the measured distance is corrected in accordance with the distance to the obstacle.

Figure 6:
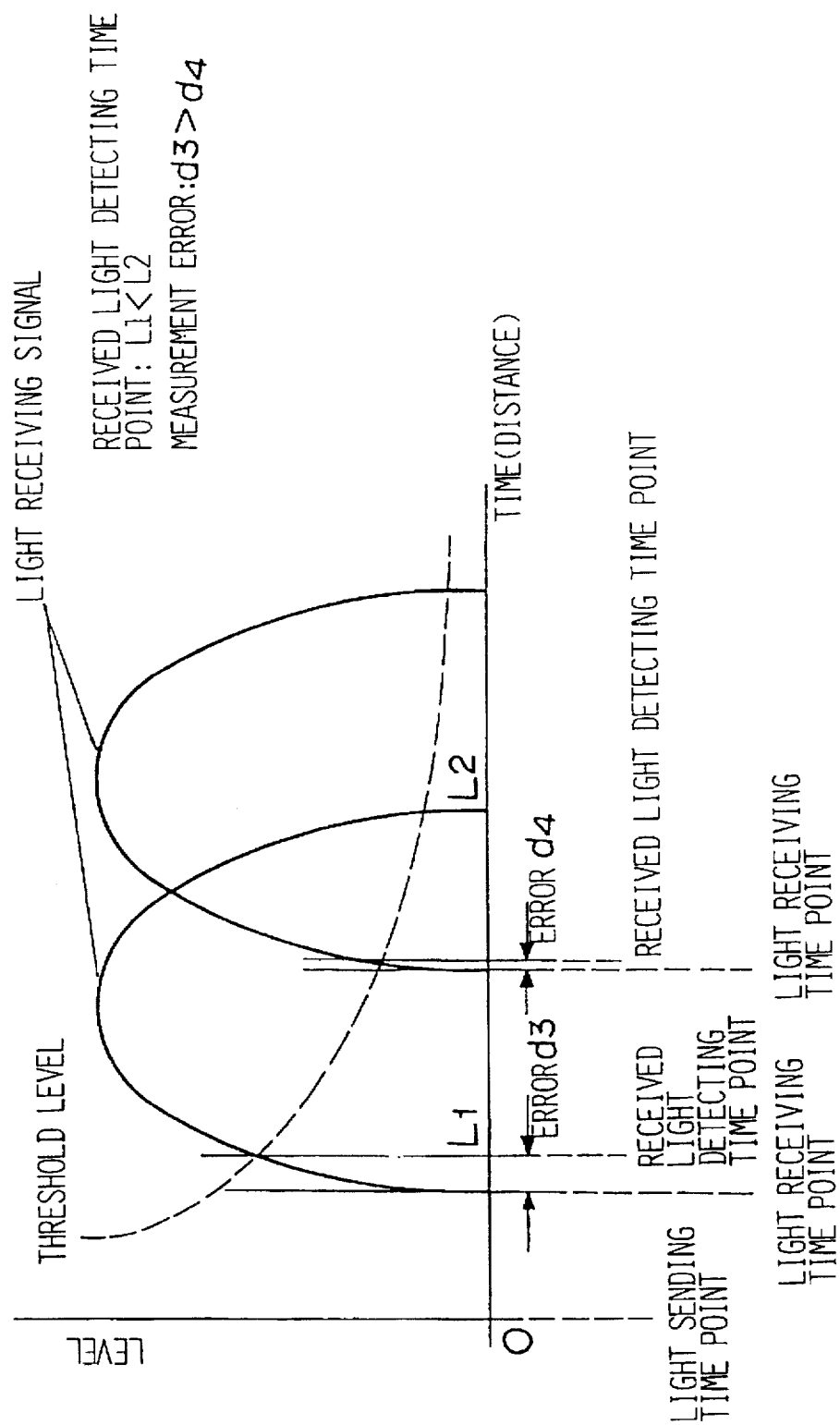
FIG. 6 is an explanatory view showing a further problem of the first embodiment.

FIG. 6 is an explanatory view showing a further problem of Embodiment 1 wherein although the signal intensities of the light receiving signals are the same with each other, the distances are different from each other.

In Embodiment 1, the threshold level rises toward left to prevent erroneous detection caused by a disturbance and the detection sensitivity is lowered at a portion of the propagation delay time period that is comparatively short. However, the error is larger in a case where the propagation delay time period is shorter than that in a case where it is longer, that is, the distance to the obstacle 3 is shorter even in the light receiving signals having the same signal intensity as shown in FIG. 6.

In Embodiment 3 the correction value is determined in accordance with the measured distance whereby the measured distance is corrected.

Figure 7:
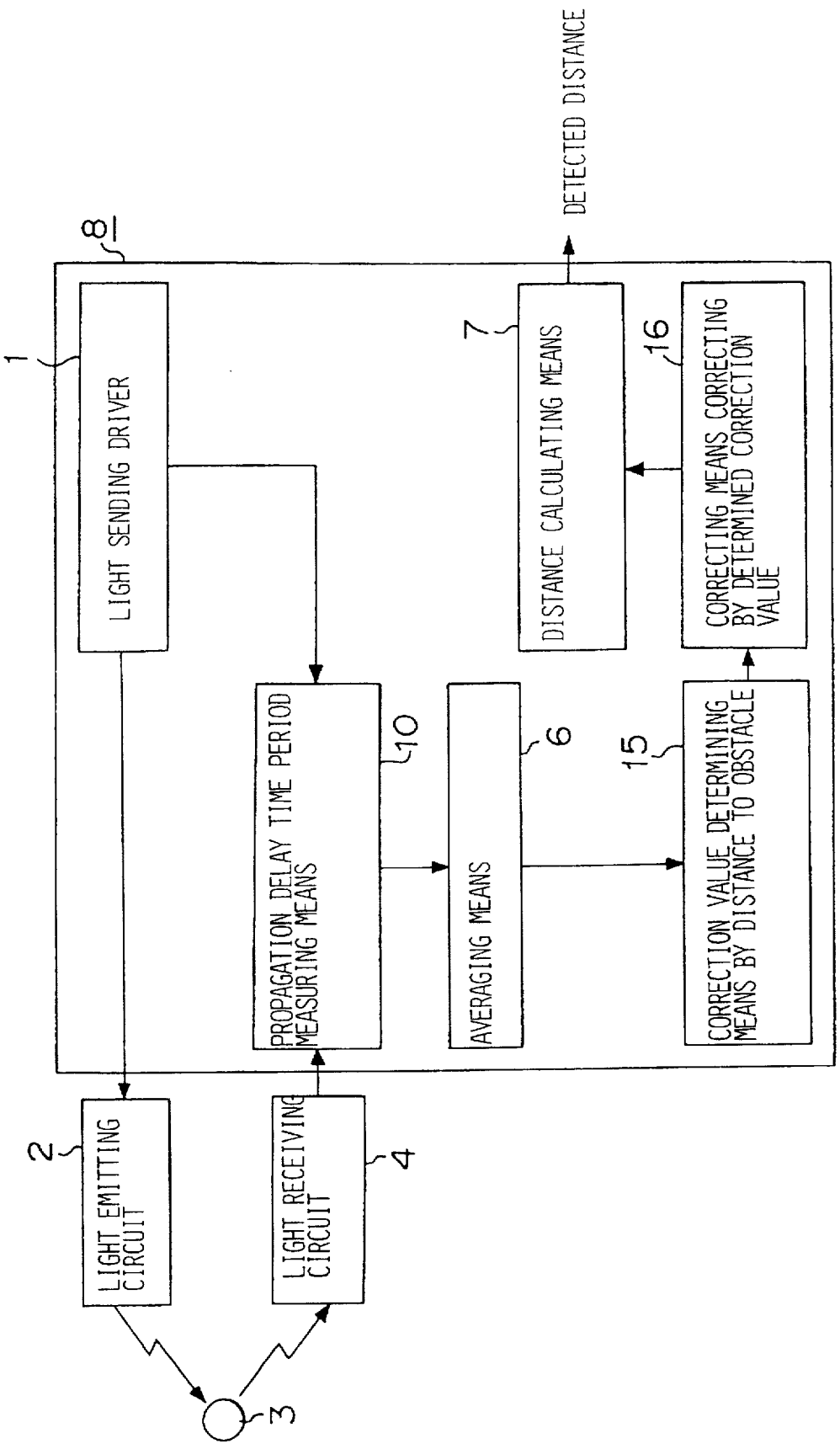
FIG. 7 is a block diagram showing the construction of a third embodiment.

FIG. 7 is a block diagram showing the construction of Embodiment 3. In FIG. 7 portions the same or the corresponding portions of the formerly designated ones are attached with the same notations. Numeral 15 designates a correction value determining means for determining a correction value that is a second correction value based on the measured distance calculated by the distance calculating means 7 and numeral 16 designates a correcting means for correcting the measured distance based on the correction value which has been determined by the correction value determining means 15 wherein the correction value determining means 15 and the correcting means 16 constitute a second correcting means.

Figure 8:
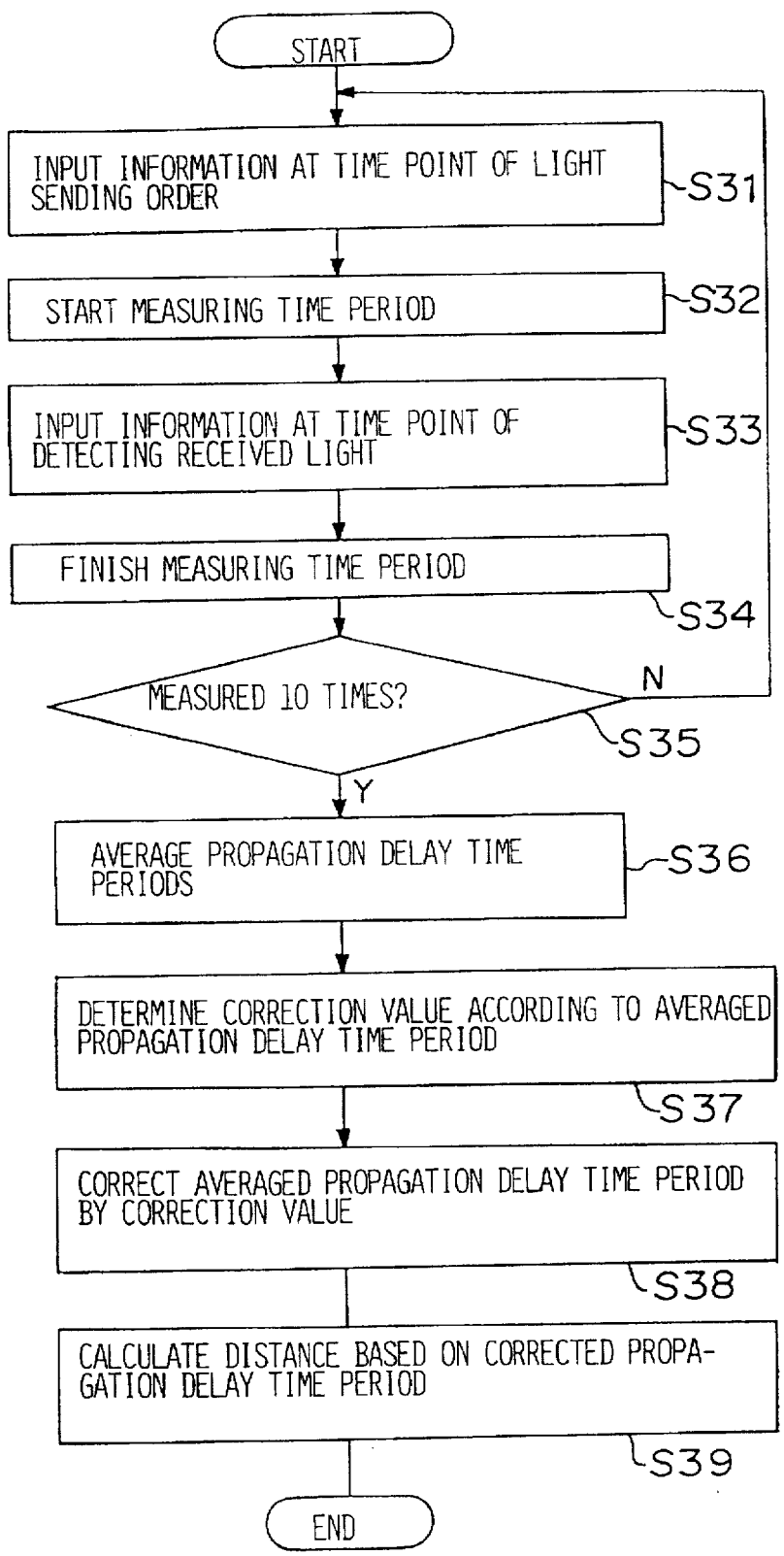
FIG. 8 is a flow chart showing the operation of the third embodiment.

FIG. 8 is a flow chart showing the operation of Embodiment 3 and an explanation will be given of the operation of Embodiment 3 in reference to FIG. 8.

In step S31 the light sending driver 1 detects that the light sending order is outputted and in response thereto, in step S32 the operation starts measuring a time period by a counter, not shown. The counting by the counter is performed by incrementing by 1 at every time of detecting a pulse of a pulse series having a predetermined frequency. In step S33 the operation compares the light receiving signal which has been generated at the light receiving circuit 4 with a predetermined threshold level rising to left and detects a time point at which the light receiving signal is equal to or larger than the threshold level as the received light detecting time point. In step S34 the operation stops the counting operation of the counter by detecting the received light detecting time point, stores the counted value of the counter as the propagation delay time period and clears the counter in preparation for the counting operation at the next time. In step S35 the operation determines whether the measurement of the propagation delay time has been performed by a predetermined number of times, for example 10 times, returns to step S31 when it is smaller than 10 times, proceeds to step S36 when it reaches 10 times and averages the propagation delay time periods of 10 times.

In step 37 the operation determines the correction value in accordance with the averaged propagation delay time period which has been provided in step S36. With regard to the correction value, as shown in FIG. 6, the correction value corresponding to the error d3 is determined when the averaged propagation delay time period is L1 whereas the correction value in correspondence with the error d4 is determined when the averaged propagation delay time period is L2.

Further, these correction values are given by data of time in correspondence with the errors. These data are stored in a table which has been set in plural number of stages in correspondence with the averaged propagation delay time periods and values of the table are read in accordance with values of the averaged propagation delay time periods.

In step S38, the operation adds the correction value which has been determined in step S37 to the averaged propagation delay time period. In step S39 the operation calculates the distance to the obstacle based on the propagation delay time period which has been corrected in step S38.

Therefore, according to Embodiment 3, the distance to the obstacle can accurately be measured even if the distance between the obstacle and a driving vehicle is varied.

Further, although a plurality of correction values are set in and read from the table in Embodiment 3, a function or the like may be provided and the correction values may continuously be calculated based on the function.

Further, although the correction values are data of time in Embodiment 3, they may be data of distance.

That is, firstly, a distance in correspondence with the averaged propagation time period is calculated. Here, the correction values are set as data of distance corresponding to the time period of the error d3 or d4 as shown in FIG. 3.

Accordingly, the correction values set as data of distance in accordance with the distance to the obstacle which has been calculated based on the averaged propagation delay time period is read and the correction value is added to the distance to the obstacle.

EMBODIMENT 4

Figure 9:
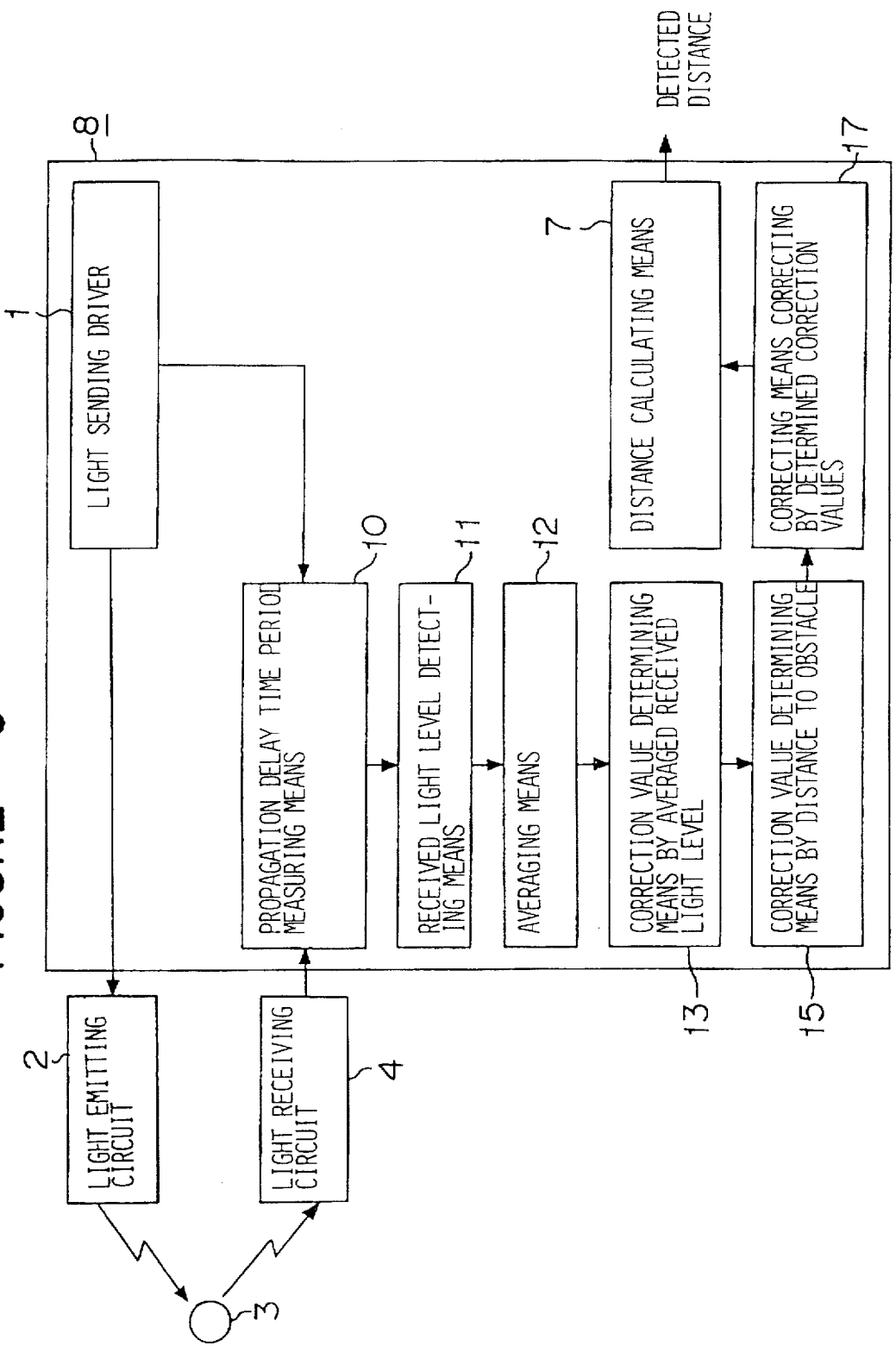
FIG. 9 is a block diagram showing the construction of a fourth embodiment.

Embodiment 4 is a combination of Embodiments 1 through 3. FIG. 9 is a block diagram showing the construction of Embodiment 4. In FIG. 4, portions the same with or corresponding to portions of the formerly designated ones are attached with the same notations. Numeral 17 designates a correcting means for correcting by using two correction values.

When the light sending order is outputted from the light sending driver 1, the light emitting circuit 2 receives the order and emits light in a predetermined direction. The light is reflected by the obstacle 3 and a portion of the reflected light is received by the light receiving circuit 4. The light receiving circuit 4 which has received the reflected light generates the light receiving signal in accordance with the intensity of the reflected light and gives the signal to the propagation delay time period measuring means 10. The propagation delay time period measuring means 10 compares the light receiving signal with the threshold level which is set such that the level of the value for the comparison reference is larger in a case where the propagation delay time period is shorter than that in a case where it is longer, recognizes the time period at which the light receiving signal is equal to or larger than the threshold level as the received light detecting time point and measures a time period from a time point of outputting the light sending order to a time point of detecting the received light as the propagation delay time period. Further, the received light level detecting means 11 detects the signal level of the light receiving signal. The propagation delay time period and the light receiving level are measured respectively by a plural number of times, for example 10 times and are respectively averaged by the averaging means 12. A first correction value is determined in the correction value determining means 13 based on the averaged light receiving level. Further, a second correction value is determined in the correction value determining means 15 based on the propagation delay time period which has been averaged by the averaging means 12. The correcting means 17 corrects the propagation delay time period by the determined first and second correction values and the distance calculating means 7 calculates the distance to the obstacle 3 based on the corrected propagation delay time period and outputs it.

Further, in Embodiment 4, the correction value determining means 13 and the correcting means 17 constitute a first correcting means whereas the correction value determining means 15 and the correcting means 17 constitute a second correcting means.

Figure 10:
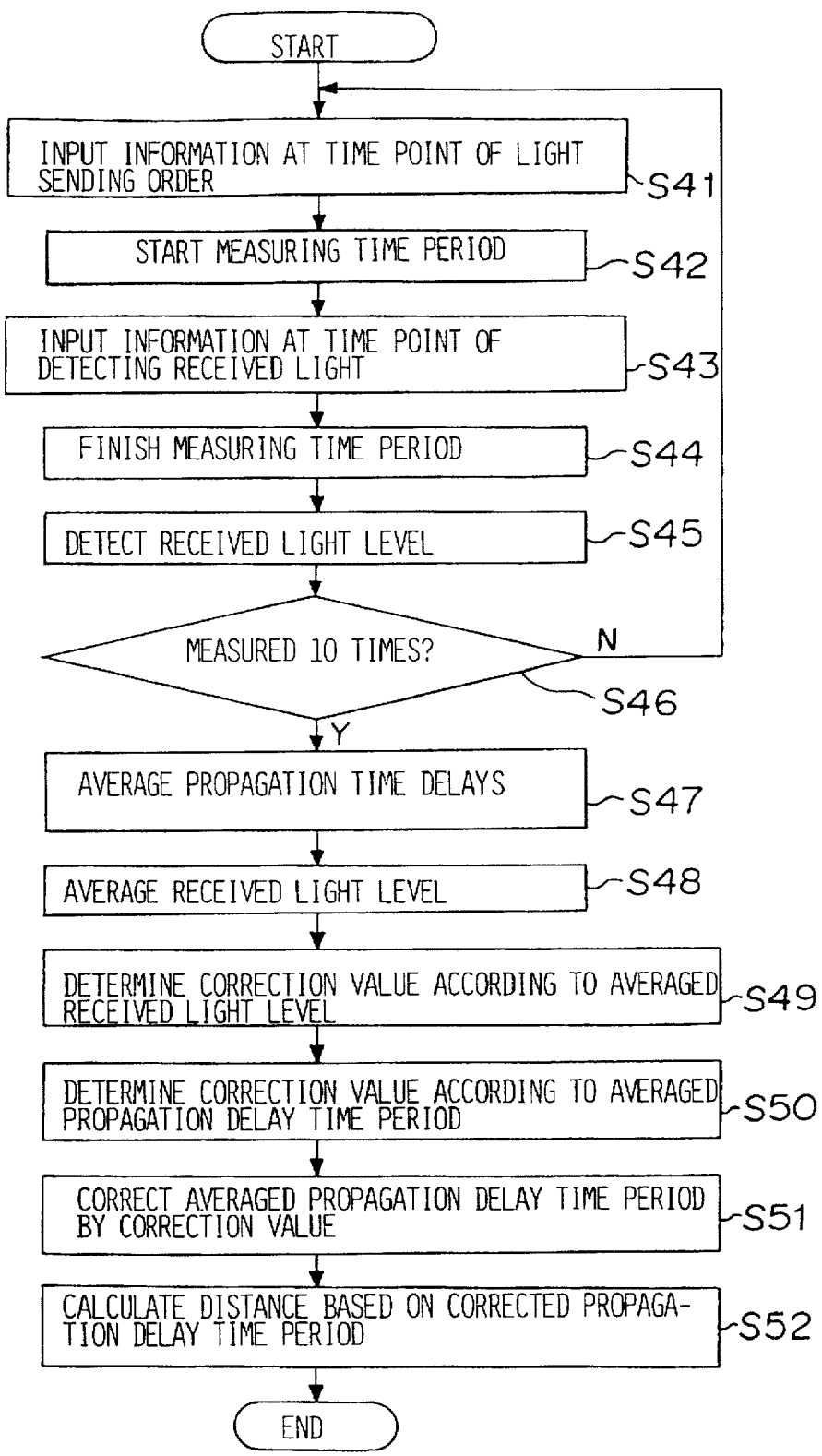
FIG. 10 is a flow chart showing the operation of the fourth embodiment.

FIG. 10 is a flow chart showing the operation of Embodiment 4.

In step S41 the operation detects that the light sending driver 1 outputs the light sending order and in response thereto the operation starts measuring a time period by a counter, not shown, in step S42. The counting by the counter is performed by incrementing by 1 at every time of detecting a pulse of a pulse series having a predetermined frequency. In step S43 the operation compares the light receiving signal which has been generated in the light receiving circuit 4 with a predetermined threshold level rising to left and detects a time point at which the signal is equal to or larger than the threshold level as the received light detecting time point. In step S44 the operation stops the counting operation of the counter by detecting the received light detecting time point, stores the counted value of the counter as the propagation delay time period and clears the counter in preparation for the counting operation at the next time. In step S45 the operation detects the light receiving level, that is, the signal level shown in FIG. 3. In step S46 the operation determines whether the measurement of the propagation delay time period has been performed by a predetermined number of times, for example, 10 times, returns to step S41 when it is smaller than 10 times, proceeds to step S47 when it reaches 10 times and averages the propagation delay time periods of 10 times. The operation similarly averages the light receiving levels of 10 times in step S48.

In step S49, the operation determines the correction value in accordance with the averaged light receiving level. With regard to the correction value, as shown in FIG. 3, the correction value in corresponding to the error d1 is determined when the averaged light receiving level is h1 whereas the correction value in correspondence to the error d2 is determined when the averaged light receiving level is h2.

Further, these correction values are given by data of time corresponding to the errors. These data are stored in a table which has been set in a plural number of stages corresponding to the light receiving levels and values of the table are read in accordance with values of the averaged light receiving levels.

In step S50 the operation determines the correction value in accordance with the averaged propagation delay time period which has been provided in step S47. With regard to the correction value, as shown in FIG. 6, the correction value in correspondence with the error d3 is determined when the averaged propagation delay time period is L1 whereas the correction value in correspondence with the error d4 is determined when the averaged propagation delay time period is L2.

Further, these correction values are given by data of time corresponding to the errors. These data are stored in a table which has been set in a plural number of stages in correspondence with the averaged propagation delay time periods and values of the table are read in correspondence with values of the averaged propagation delay time periods.

15

In step S51 the operation adds the correction value which has been determined in step S49 and the correction value which has been determined in step S50 respectively to the propagation delay time period which has been averaged in step S47.

In step S52 the operation calculates the distance to the obstacle 3 based on the corrected propagation delay time period.

Therefore, according to Embodiment 4, prevention of erroneous detection caused by disturbances of fog, rain etc. and reduction of measurement error due to a difference in the signal intensity of the light receiving signal or the distance to the obstacle can be achieved whereby the distance measuring apparatus and a distance measuring method for a vehicle which are highly reliable and capable of performing an accurate distance measurement are provided.

EMBODIMENT 5

Figure 11:
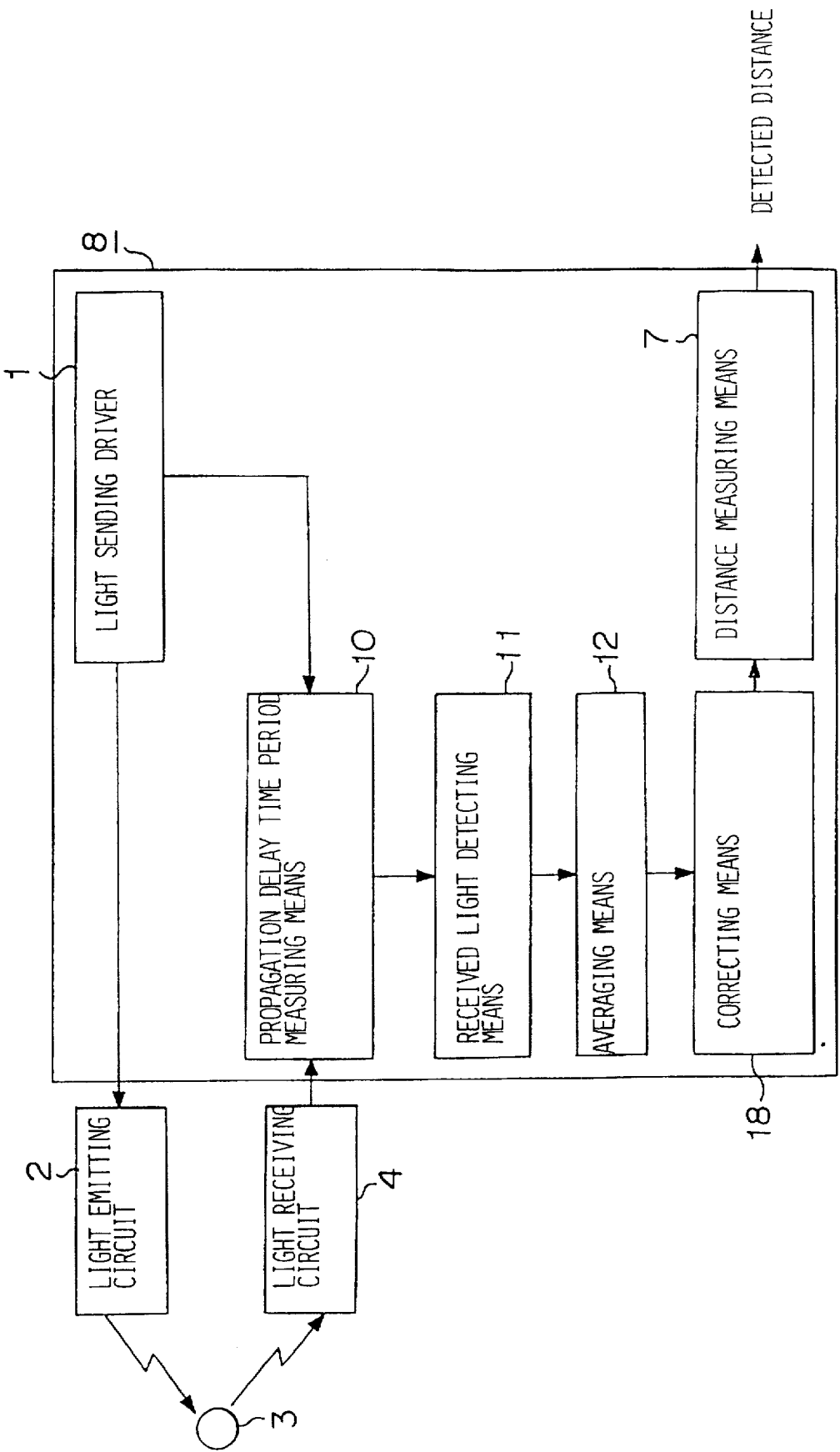
FIG. 11 is a block diagram showing the construction of a fifth embodiment.

Embodiment 5 is a simplification of Embodiment 4. Although the correction by the first correcting means and the correction by the second correcting means are time-sequentially performed in Embodiment 4, the corrections are summerizingly preformed by a third correcting means in Embodiment 5. FIG. 11 shows the construction of Embodiment 5 by a block diagram. In FIG. 11 portions the same with or corresponding to portions of the formerly designated ones are designated with the same notations. Numeral 18 designates a correcting means that is the third correcting means to which the correction value determining means 13 and 15 and the correcting means 17 correspond in Embodiment 4 and which is constituted by a single means in Embodiment 5.

Figure 12:
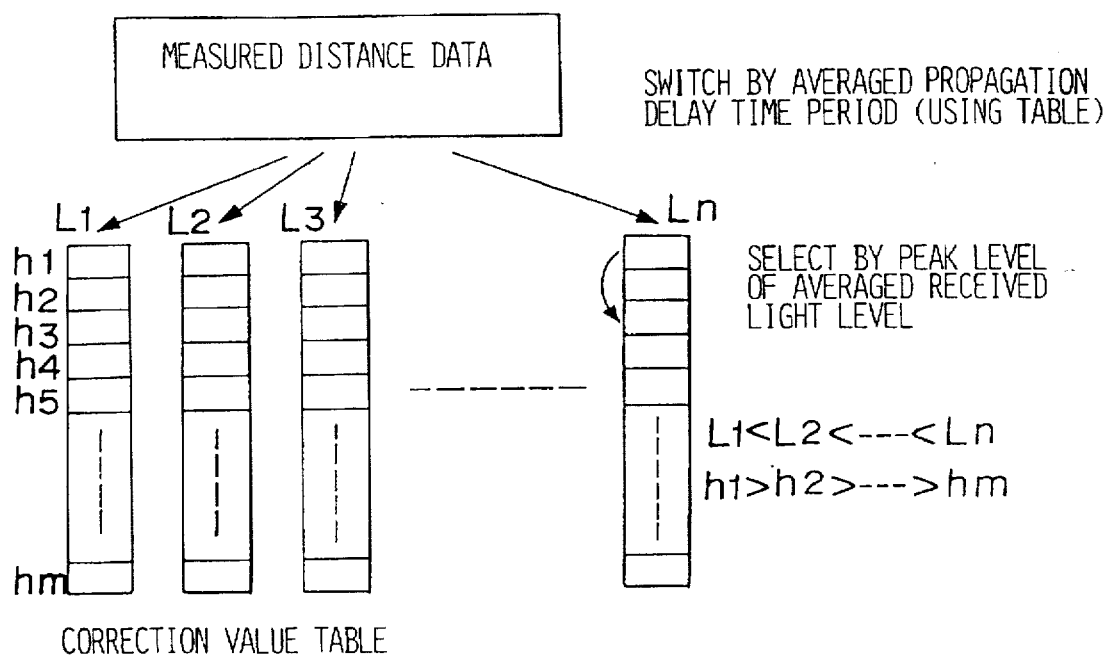
FIG. 12 is an explanatory view showing the operation of the fifth embodiment.
Figure 13:
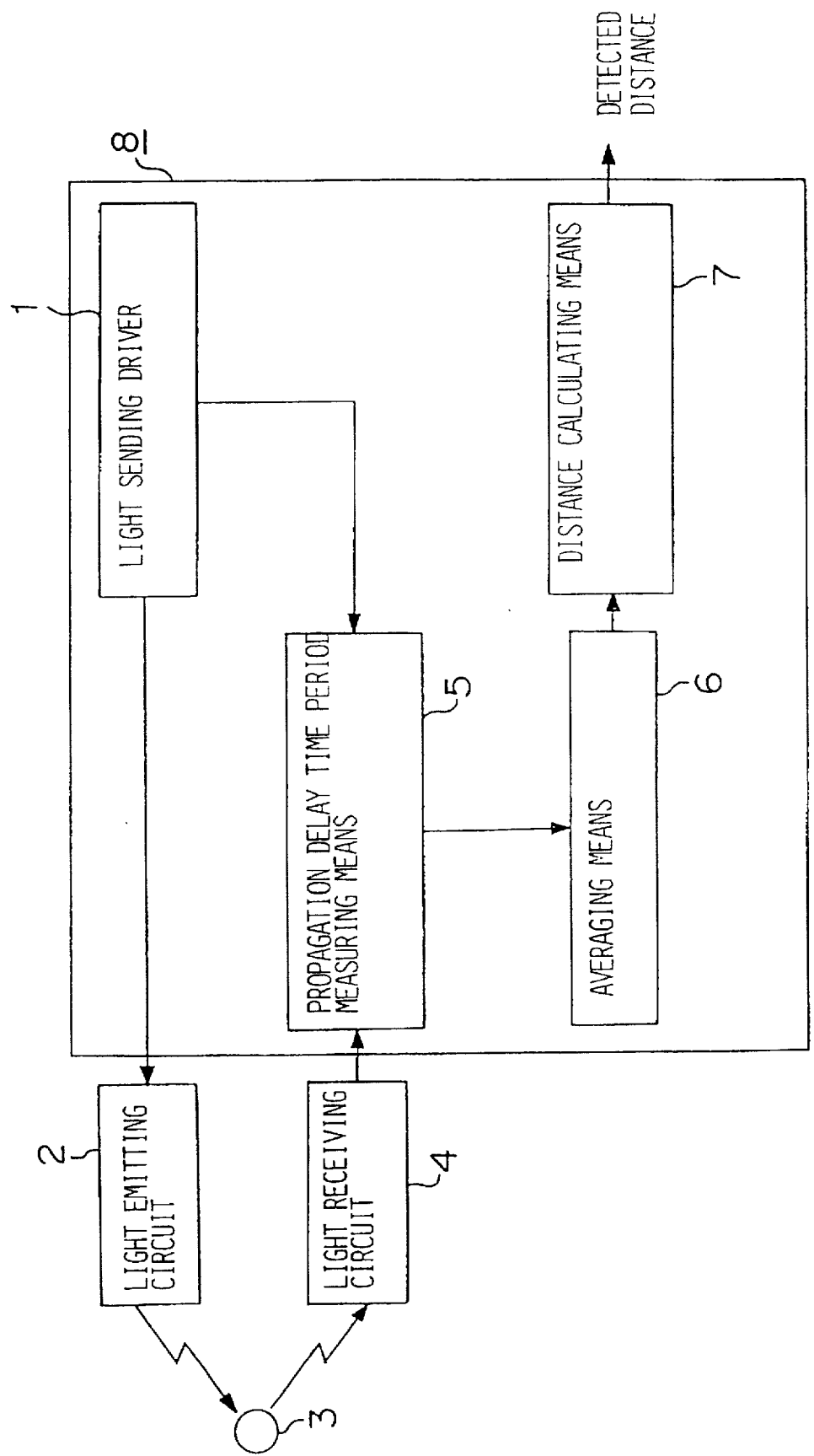
FIG. 13 is a block diagram showing a conventional distance measuring apparatus for a vehicle.
Figure 14:
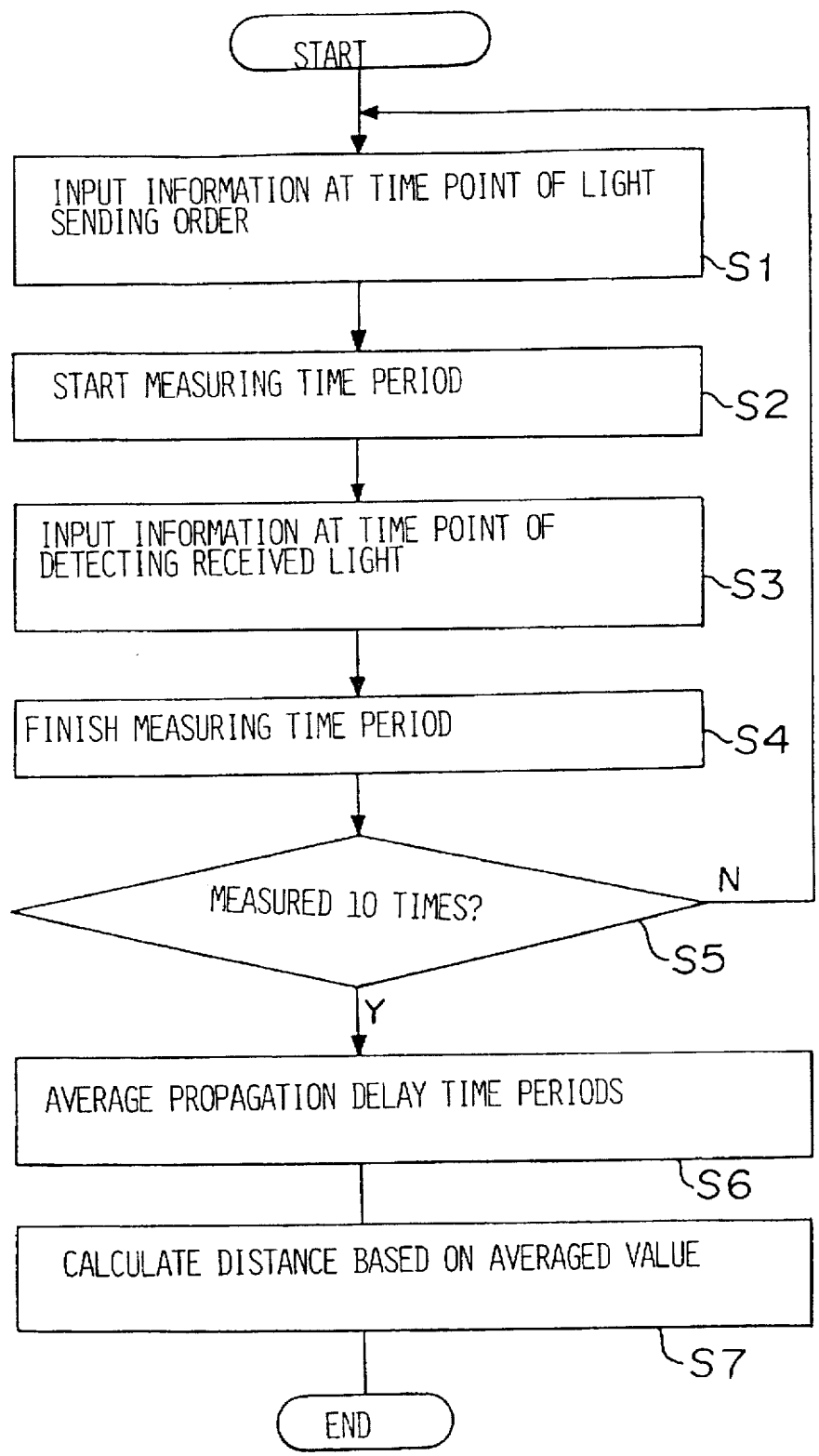
FIG. 14 is a flow chart showing the operation of the conventional apparatus.
Figure 15:
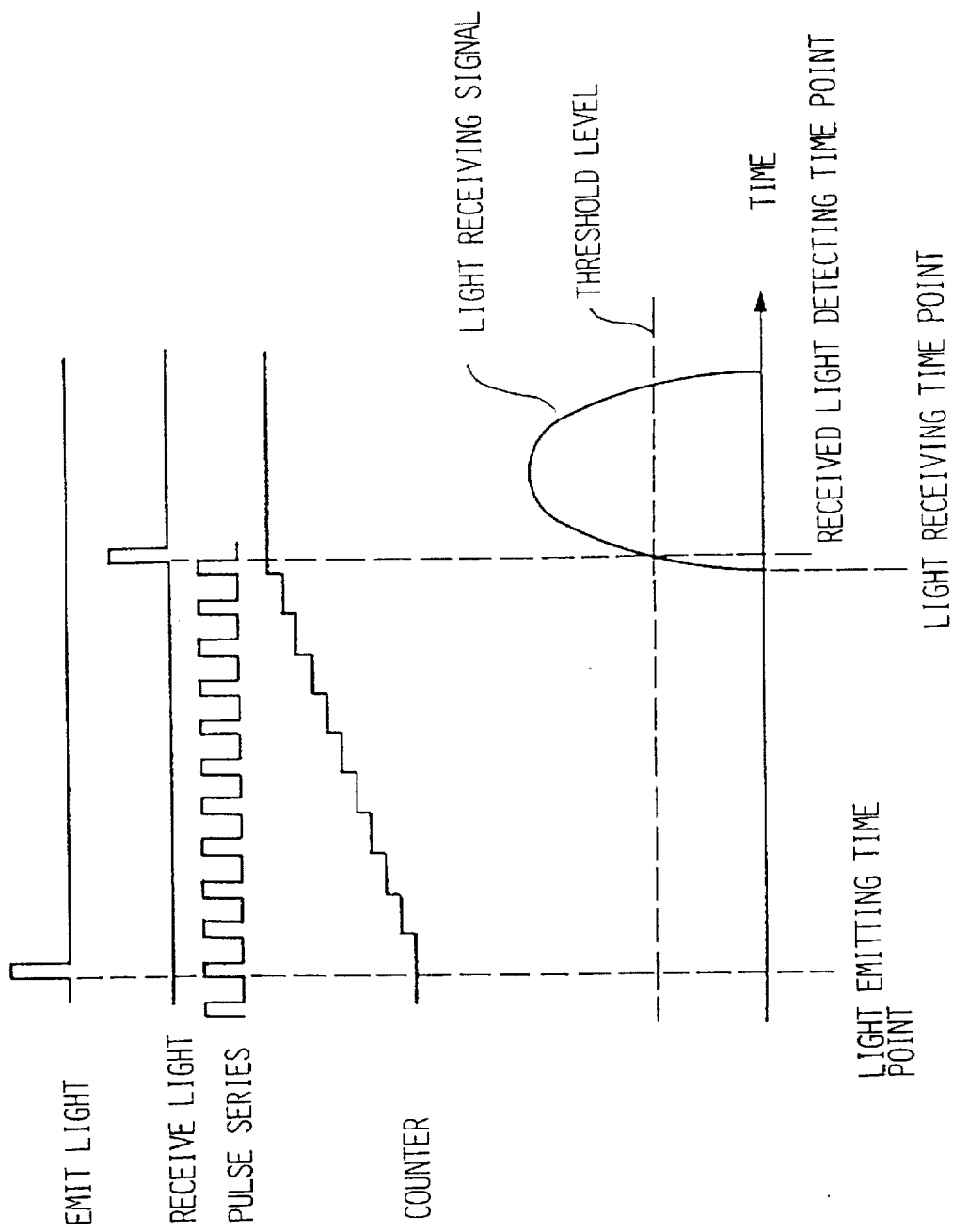
FIG. 15 illustrates time charts showing the operation of the conventional apparatus.
Figure 16:
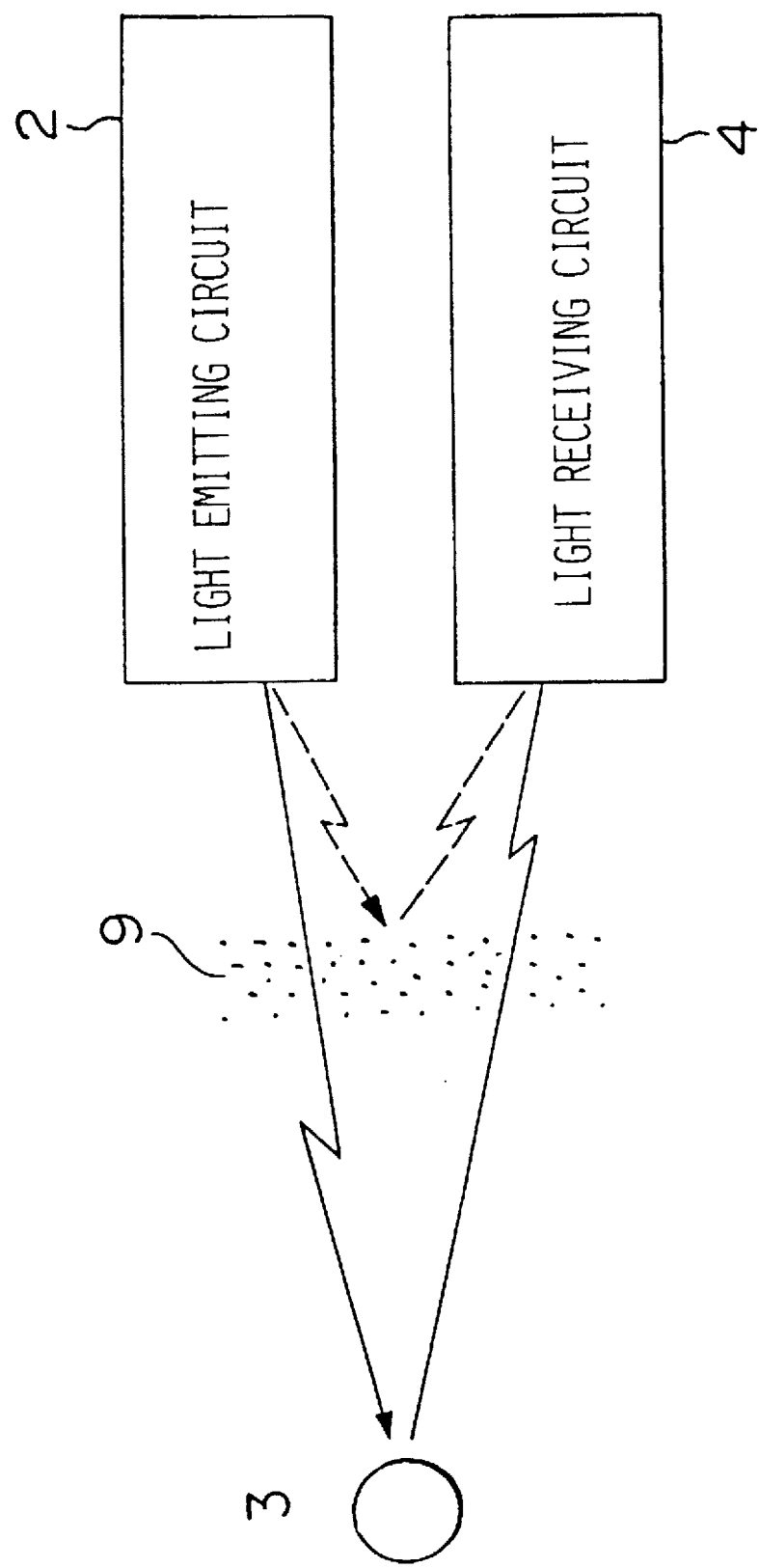
FIG. 16 is an explanatory view explaining a problem of the conventional apparatus.
Figure 17:
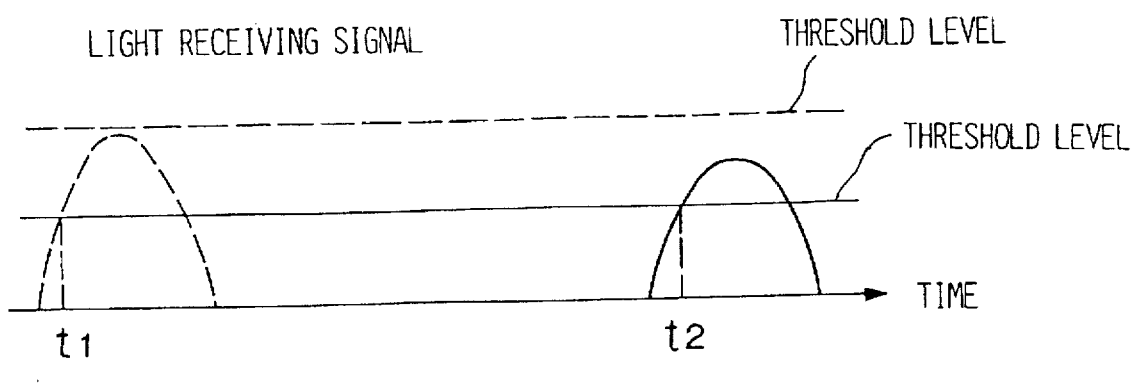
FIG. 17 is an explanatory view explaining a problem of the conventional apparatus.
Figure 18:
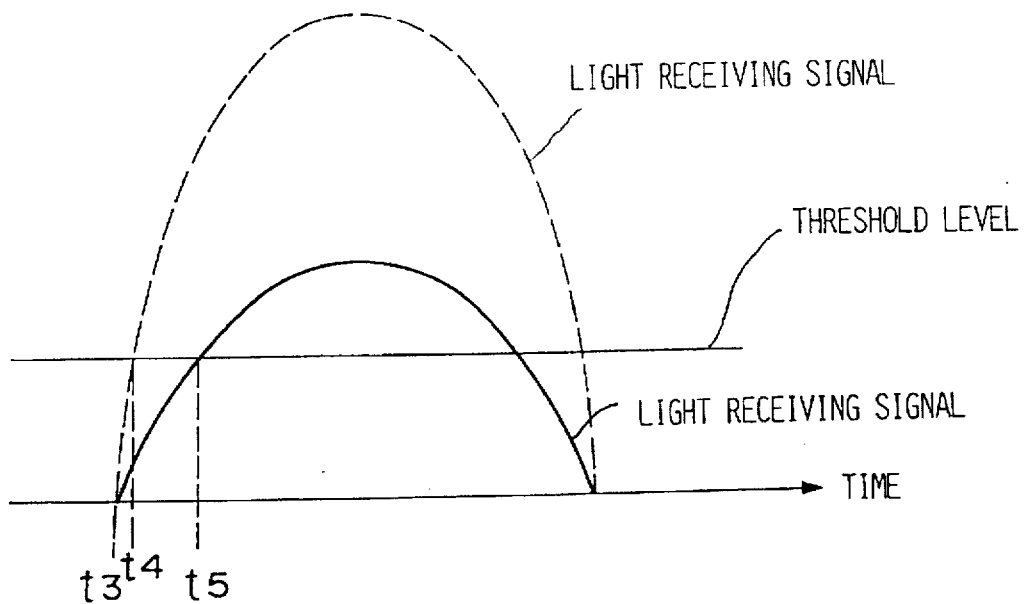
FIG. 18 is an explanatory view explaining a problem of the conventional apparatus.

FIG. 12 is an explanatory view showing the operation of Embodiment 5. Further, the basic operation of Embodiment 5 is similar to that of Embodiment 4.

As explained above the averaged propagation delay time period and the averaged light receiving level are outputted from the averaging means 12. The correcting means 18 calculates the correction value as the third correction value by receiving these two informations.

That is, either one of correction value tables L1 through Ln shown in FIG. 12 is selected by the averaged propagation delay time period and which value stored in an address in the selected correction value table is to be used is determined by the averaged light receiving level.

The correction value provided thereby is added to the averaged propagation delay time period. Further, the distance calculating means 7 calculates the distance to the obstacle based on the corrected propagation delay time period.

Therefore, according to Embodiment 5, the apparatus can be simplified and the simplification of calculating is achieved.

Further, although a plurality of correction value tables are prepared and used by selecting one therefrom in Embodiment 5, the correction value may be provided by a single reading operation by storing the correction values in a two-dimensional table having parameters of the propagation delay time period and the light receiving level.

According to the distance measuring apparatus for a vehicle of the present invention, the distance measuring apparatus for a vehicle is provided with the comparison value which is set such that the value of the comparison difference is larger in the case where the propagation delay time period from irradiating to receiving an electromagnetic wave is shorter than that in the case where it is longer, compares the receiving signal with the comparison value and recognizes the time point at which the receiving signal is equal to or larger than the comparison value as the received light detecting time point and is provided with the propagation delay time period measuring means for measuring the time period from the time point at which the irradiating means irradiates an electromagnetic wave to the received light detecting time point whereby erroneous detection of the obstacle by disturbance is not performed.

Further, according to the distance measuring apparatus for a vehicle of the present invention, the distance measuring apparatus for a vehicle is provided with the signal intensity detecting means for detecting the signal intensity of the receiving signal, the first correction value set in accordance with the signal intensity and the first correcting means for correcting the distance by using the first correction value whereby an accurate distance can be measured irrespective of the signal intensity of the receiving signal.

Further, according to the distance measuring apparatus of the present invention, the distance measuring apparatus for a vehicle is provided with the second correction value set in accordance with the distance to the obstacle and the second correcting means for correcting the distance by using the second correction value whereby an accurate distance can be measured irrespective of the distance to the obstacle.

Further, according to the distance measuring apparatus for a vehicle of the present invention, the distance measuring apparatus for a vehicle is provided with the comparison value which is set such that the value for the comparison reference is larger in the case where the propagation delay time period from irradiating to receiving an electromagnetic wave is shorter than that in the case where it is longer, compares the receiving signal with the comparison value and recognizes the time point at which the receiving signal is equal to or larger than the comparison value as the received light detecting time point and is provided with the propagation delay time period measuring means for measuring the propagation delay time period from the time point at which the irradiating means irradiates the electromagnetic wave to the received light detecting time point, the distance calculating means for calculating the distance between the obstacle and the driving vehicle based on the propagation delay time period, the signal intensity detecting means for detecting the signal intensity of the receiving signal, the first correction value set in accordance with the signal intensity, the first correcting means for correcting the distance by using the first correction value, and the second correction value set in accordance with the distance to the obstacle and the second correcting means for correcting the distance by using the second correction value whereby an accurate distance can be measured with no erroneous detection of the obstacle.

Further, according to the distance measuring apparatus for a vehicle, the first correcting means and the second correcting means are constituted by the third correcting means provided with the third correction value set in accordance with both of the signal intensity and the distance for simultaneously performing the corrections based on the signal intensity and the distance by using the third correction value whereby simplification of the apparatus can be performed.

Further, the distance measuring method according to the present invention includes the step of comparing the comparison value which is set such that the value for the comparison reference is larger in the case where the propagation delay time period from irradiating to receiving is shorter than that in the case where it is longer with the receiving signal generated by receiving the reflected wave and recognizing the time point at which the receiving signal is equal to or larger than the comparison value as the received light detecting time point, the step of measuring the propagation delay time period from the time point at which the electromagnetic wave is irradiated to the received light detecting time point and the step of calculating the distance between the obstacle and the driving vehicle based on the propagation delay time period whereby erroneous detection of obstacle by disturbances or the like can be prevented.

Further, the distance measuring method according to the present invention includes the step of detecting the signal intensity of the receiving signal and the step of calculating the first correction value based on the signal intensity and correcting the distance by using the first correction value whereby an accurate distance can be measured irrespective of the signal intensity of the receiving signal.

Further, the distance measuring method according to the present invention includes the step of calculating the second correction value based on the distance provided by the step of calculating the distance and correcting the distance by using the second correction value whereby an accurate distance can be measured irrespective of the distance to the obstacle.

Further, the distance measuring method according to the present invention includes the step of comparing the comparison value which is set such as the value for the comparison reference is larger in the case where the propagation delay time period from irradiating to receiving is shorter than that in the case where it is longer with the receiving signal generated by receiving the reflected wave and recognizing the time point at which the receiving signal is equal to or larger than the comparison value as the received light detecting time point, the step of measuring the propagation delay time period from the time point at which the electromagnetic wave is irradiated to the received light detecting time point, the step of calculating the distance between the obstacle and the driving vehicle based on the propagation delay time period, the step of detecting the signal intensity of the signal receiving signal, the step of calculating the first correction value based on the signal intensity and correcting the distance by using the first correction value and the step of calculating the second correction value based on the distance provided by the step of calculating the distance and correcting the distance by using the second correction value whereby an accurate distance to the obstacle can be measured with no erroneous detection of the obstacle caused by disturbance.

Further, according to the distance measuring method of the present invention, the corrections based on the first correction value and the second correction value are simultaneously performed by using the third correction value set in accordance with both of the distance and the signal intensity whereby the calculation can be simplified.

What is claimed is:

1. A distance measuring apparatus for a vehicle comprising:

an irradiating means for emitting and irradiating an electromagnetic wave;

a receiving means for receiving a reflected wave produced when the electromagnetic wave is reflected by an obstacle and generating a receiving signal;

a propagation delay time period measuring means, having a variable comparison value which is larger when a propagation delay time period is shorter, for comparing the receiving signal with the variable comparison value, and measuring the propagation delay time period between the time when the electromagnetic wave is irradiated and a time when the receiving signal is equal to or larger than the variable comparison value; and a distance calculating means for calculating a distance between the obstacle and the vehicle based on the propagation delay time period.

2. A distance measuring apparatus for a vehicle comprising:

an irradiating means for emitting and irradiating an electromagnetic wave;

a receiving means for receiving a reflected wave produced when the electromagnetic wave is reflected by an obstacle;

a propagation delay time period measuring means for recognizing a time point at which the receiving signal is equal to or larger than a predetermined comparison value as a received light detecting time point, and measuring a propagation delay time period between a time point at which the irradiating means irradiates the electromagnetic wave and the received light detecting time point;

a distance calculating means for calculating a distance between the obstacle and a driving vehicle based on the propagation delay time period;

a signal intensity detecting means for detecting a signal intensity of the receiving signal; and a first correcting means provided with a first correction value set in accordance with the signal intensity for correcting the distance using the first correction value.

3. The distance measuring apparatus according to claim 2, further comprising a second correcting means provided with a second correction value set in accordance with the distance to the obstacle for correcting the distance using the second correction value.

4. A distance measuring apparatus for a vehicle comprising:

an irradiating means for emitting and irradiating an electromagnetic wave;

a receiving means for receiving a reflected wave produced when the electromagnetic wave is reflected by an obstacle and generating a receiving signal;

a propagation delay time period measuring means, having a variable comparison value which is larger when a propagation delay time period is shorter, for comparing the receiving signal with the variable comparison value, and measuring the propagation delay time period between the time when the electromagnetic wave is irradiated and a time when the receiving signal is equal to or larger than the variable comparison value;

a distance calculating means for calculating a distance between the obstacle and a driving vehicle based on the propagation delay time period;

a signal intensity detecting means for detecting a signal intensity of the receiving signal;

a first correcting means provided with a first correction value set in accordance with the signal intensity for correcting the distance using the first correction value; and a second correcting means provided with a second correction value set in accordance with the distance to the obstacle for correcting the distance using the second correction value.

5. The distance measuring apparatus according to claim 4, wherein the first correcting means and the second correcting means are constituted by a third correcting means provided with a third correction value set in accordance with both the signal intensity and the distance for simultaneously performing a correction based on the signal intensity and the distance using the third correction value.

6. A distance measuring method for measuring a distance to an obstacle based on a propagation delay time period from when an electromagnetic wave is irradiated to when a reflected wave produced when the electromagnetic wave is reflected by the obstacle is received comprising the steps of:

comparing a receiving signal generated by receiving the reflected wave with a variable comparison value which is larger when the propagation delay time period from irradiating to receiving the electromagnetic wave is shorter, and recognizing a time point at which the receiving signal is equal to or larger than the variable comparison value as a received light detecting time point;

measuring the propagation delay time period between a time point at which the electromagnetic wave is irradiated and the received light detecting time point; and calculating a distance between the obstacle and a driving vehicle based on the propagation delay time period.

7. A distance measuring method for measuring a distance to an obstacle based on a propagation delay time period from when an electromagnetic wave is irradiated to when a reflected wave produced when the electromagnetic wave is reflected by an obstacle is received comprising the steps of:

comparing a receiving signal generated by receiving the reflected wave with a predetermined comparison value and recognizing a time point at which the receiving signal is equal to or larger than the comparison value as a received light detecting time point;

measuring the propagation delay time period from a time point at which the electromagnetic wave is irradiated to the received light detecting time period;

calculating a distance between the obstacle and a driving vehicle based on the propagation delay time period;

detecting a signal intensity of the receiving signal; and calculating a first correction value based on the signal intensity and correcting the distance by using the first correction value.

8. The distance measuring method according to claim 7, further comprising a step of calculating a second correction value based on the distance provided by the step of calculating the distance and correcting the distance by using the second correction value.

9. A distance measuring method for measuring a distance to an obstacle based on a propagation delay time period from when an electromagnetic wave is irradiated to when a reflected wave produced when the electromagnetic wave is reflected by an obstacle is received comprising the steps of:

comparing a receiving signal generated by receiving the reflected wave with a variable comparison value which is larger when the propagation delay time period from irradiating to receiving the electromagnetic wave is shorter, and recognizing a time point at which the receiving signal is equal to or larger than the variable comparison value as a received light detecting time period;

measuring the propagation delay time period between a time point at which the electromagnetic wave is irradiated and the received light detecting time point;

calculating a distance between the obstacle and a driving vehicle based on the propagation delay time period;

detecting a signal intensity of the receiving signal;

calculating a first correction value based on the signal intensity and correcting the distance using the first correction value; and calculating a second correction value based on the distance provided by the step of calculating the distance and correcting the distance using the second correction value.

10. The distance measuring method according to claim 9, wherein the steps of correcting based on the first correction value and the second correction value are simultaneously performed using a third correction value set in accordance with both the signal intensity and the distance.

* * * * *